United States Patent
Chen et al.

(10) Patent No.: US 10,701,592 B2
(45) Date of Patent: Jun. 30, 2020

(54) SERVICE DATA FLOW PACKET TRANSMISSION METHOD, APPARATUS, AND SYSTEM

(71) Applicant: Huawei Technologies Co., Ltd., Shenzhen (CN)

(72) Inventors: Zhongping Chen, Shanghai (CN); Han Zhou, Shanghai (CN); Yuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/965,025

(22) Filed: Apr. 27, 2018

(65) Prior Publication Data

US 2018/0249377 A1 Aug. 30, 2018

Related U.S. Application Data

(63) Continuation of application No. PCT/CN2015/094014, filed on Nov. 6, 2015.

(51) Int. Cl.
*H04W 28/10* (2009.01)
*H04W 28/08* (2009.01)
(Continued)

(52) U.S. Cl.
CPC .......... *H04W 28/10* (2013.01); *H04W 28/065* (2013.01); *H04W 28/08* (2013.01); *H04W 88/16* (2013.01)

(58) Field of Classification Search
CPC .................................................. H04W 28/10
See application file for complete search history.

(56) References Cited

U.S. PATENT DOCUMENTS

2012/0300638 A1* 11/2012 Zhou ............... H04W 28/12
2013/0242728 A1* 9/2013 Chaudhuri ........... H04W 28/20
(Continued)

FOREIGN PATENT DOCUMENTS

| CN | 102238632 A | 11/2011 |
| CN | 102238634 B | 5/2015 |
| WO | 2015070592 A1 | 5/2015 |

OTHER PUBLICATIONS

3GPP TR 23.714 V0.1.0, 3rd Generation Partnership Project;Technical Specification Group Services and System Aspects;Study on control and user plane separation of EPC nodes, (Release 14), Oct. 2015, 9 pages.

(Continued)

*Primary Examiner* — Ronald B Abelson
(74) *Attorney, Agent, or Firm* — Leydig, Voit & Mayer, Ltd.

(57) ABSTRACT

Embodiments of the present disclosure disclose a service data flow packet transmission method, apparatus, and system. The method includes: determining, by a first gateway device after receiving a service data flow packet sent by a second gateway device, whether the service data flow packet enables a local data flow offload policy; and if can, sending, by the first gateway device according to the local data flow offload policy, the service data flow packet to a service network corresponding to the service data flow packet; or if not, sending the service data flow packet to the second gateway device, so that the second gateway device performs an operation corresponding to the service data flow packet.

10 Claims, 13 Drawing Sheets

(51) Int. Cl.
*H04W 28/06* (2009.01)
*H04W 88/16* (2009.01)

(56) References Cited

U.S. PATENT DOCUMENTS

2013/0322240 A1* 12/2013 Deng .................... H04W 76/02
2014/0254576 A1*  9/2014 Varma ................... H04W 48/16
2016/0294682 A1   10/2016 Bi et al.
2017/0180259 A1*  6/2017 Yu ........................ H04W 28/20

OTHER PUBLICATIONS

Namal, Suneth, "Architectural EPC extensions for supporting heterogeneous mobility schemes," MEVICO, Jan. 2013, 93 pages.

\* cited by examiner

SERVICE DATA FLOW PACKET TRANSMISSION METHOD, APPARATUS, AND SYSTEM

CROSS-REFERENCE TO RELATED APPLICATIONS

This application is a continuation of International Application No. PCT/CN2015/094014, filed on Nov. 6, 2015, the disclosure of which is hereby incorporated by reference in its entirety.

TECHNICAL FIELD

Embodiments of the present disclosure relate to the field of wireless network technologies, and specifically, to a service data flow packet transmission method, apparatus, and system.

BACKGROUND

To deal with challenges of wireless broadband technologies and ensure leading advantages of 3rd Generation Partnership Project (3GPP) networks, the 3GPP has initiated a Long Term Evolution (LTE) program for mobile communications networks at the end of 2004. A new mobile communications network architecture is defined under the guidance of the LTE program. The new mobile communications network architecture is flatter than existing 2G and 3G networks, and retains only a packet switched domain (PS); therefore, this network architecture may be referred to as an evolved packet system (EPS). A network architecture of the EPS may be shown in FIG. 1. FIG. 1 is a schematic diagram of an EPS network architecture disclosed in the prior art. In the EPS network architecture shown in FIG. 1, an evolved packet core (EPC) mainly includes three logical functional entities: a mobility management entity (MME), a serving gateway (S-GW), and a packet data network gateway (P-GW). The MME is mainly responsible for non-access stratum (NAS) signaling and NAS signaling encryption, roaming and tracking, allocation of a temporary subscriber identity, a security function, and the like. The MME is corresponding to a control plane part of a serving GPRS support node (SGSN) in a GERAN/UTRAN network. The S-GW is mainly responsible for functions such as a local mobility anchor, a mobility anchor in a 3GPP system, and lawful interception of related information. The P-GW is mainly responsible for related functions such as policy enforcement and charging and lawful interception.

In the EPS network architecture shown in FIG. 1, when a user equipment (UE) accesses the EPC, based on access point name (APN) information (which is configured by default or provided by the UE), a PDN connection (also referred to as a "session connection") to which an APN is directed needs to be first established for the UE. In addition, a corresponding IP address is provided for the UE in a session connection creation process. A first bearer created in the session connection is referred to as a default bearer (which is kept in an active state within an entire session connection period), and a subsequently created bearer is a dedicated bearer. When the UE performs a service, flows having a same UE IP address and flowing to a same PDN (that is, having a same APN attribute) converge into one session connection. Further, flows having a same quality of service (QoS) attribute converge into one bearer.

Currently, based on the EPS network architecture shown in FIG. 1, an implementation architecture of selected IP traffic offload (SIPTO) may be shown in FIG. 2. FIG. 2 is a schematic diagram of an implementation architecture of SIPTO disclosed in the prior art. In the 3GPP standard, a concept of offloading a service data flow packet from an access network or a location near an access network to a particular PDN is referred to as SIPTO. A basic principle of SIPTO is as follows: A gateway is deployed at a location near the access network to execute a SIPTO policy. The gateway is a local gateway (L-GW). An operator sets a particular APN for a SIPTO service data flow packet. When a PDN connection is being established, based on the particular APN, a SGSN/MME selects an L-GW, and the L-GW sends all received uplink service data flow packets of a service directly to a PDN. However, in the implementation architecture shown in FIG. 2, during SIPTO policy enforcement, the UE needs to configure a correspondence between an application (APP) and an APN, and all applications in the PDN to which the particular APN is directed need to be deployed at a location near a base station. Consequently, the APPs in the PDN cannot be differentially deployed as required. It can be learned that an existing APN-based SIPTO implementation solution has problems of poor applicability and insufficient flexibility in service data flow packet deployment.

SUMMARY

Embodiments of the present disclosure disclose a service data flow packet transmission method, apparatus, and system, so as to improve flexibility in service data flow packet deployment and applicability.

A first aspect of the embodiments of the present disclosure discloses a service data flow packet transmission method. The method includes:

receiving, by a first gateway device, a service data flow packet sent by a user equipment (UE);

determining, by the first gateway device, whether the service data flow packet enables a first local data flow offload policy; and sending, by the first gateway device according to the first local data flow offload policy when the service data flow packet enables the first local data flow offload policy, the service data flow packet to a service network corresponding to the service data flow packet; or sending, by the first gateway device, the service data flow packet to a second gateway device when the service data flow packet does not enable the first local data flow offload policy, so that the second gateway device performs an operation corresponding to the service data flow packet.

In a first possible implementation of the first aspect of the embodiments of the present disclosure, the receiving, by a first gateway device, a service data flow packet sent by a user equipment (UE) includes:

receiving, by the first gateway device, a first tunnel packet sent by the UE, and performing a tunnel header decapsulation operation on the first tunnel packet, to obtain the service data flow packet; and the sending, by the first gateway device, the service data flow packet to a second gateway device includes:

performing, by the first gateway device, a tunnel header encapsulation operation on the service data flow packet to obtain a second tunnel packet, and sending the second tunnel packet to the second gateway device.

With reference to the first aspect of the embodiments of the present disclosure or the first possible implementation of the first aspect of the embodiments of the present disclosure, in a second possible implementation of the first aspect of the embodiments of the present disclosure, after the sending, by the first gateway device, the service data flow packet to a second gateway device, the method further includes:

receiving, by the first gateway device, a first indication message sent by the second gateway device, where the first indication message includes a second local data flow offload policy for the service data flow packet, and the first indication message is used to instruct the first gateway device to send the service data flow packet to the service network according to the second local data flow offload policy; and sending, by the first gateway device, the service data flow packet to the service network according to the second local data flow offload policy.

With reference to the first aspect of the embodiments of the present disclosure or the first possible implementation of the first aspect of the embodiments of the present disclosure, in a third possible implementation of the first aspect of the embodiments of the present disclosure, after the sending, by the first gateway device, the service data flow packet to a second gateway device, the method further includes:

receiving, by the first gateway device, a second indication message sent by a third gateway device, where the second indication message includes a third local data flow offload policy, and the second indication message is used to instruct the first gateway device to send the service data flow packet to the service network according to the third local data flow offload policy; and sending, by the first gateway device, the service data flow packet to the service network according to the third local data flow offload policy.

With reference to the first aspect of the embodiments of the present disclosure or the first possible implementation of the first aspect of the embodiments of the present disclosure, in a fourth possible implementation of the first aspect of the embodiments of the present disclosure, the first local data flow offload policy is sent by the second gateway device or a third gateway device to the first gateway device.

With reference to the second possible implementation of the first aspect of the embodiments of the present disclosure, in a fifth possible implementation of the first aspect of the embodiments of the present disclosure, the first indication message further includes the service data flow packet; and the method further includes:

sending, by the first gateway device, a first response message for the first indication message to the second gateway device, where the first response message is used to indicate that the first indication message has been successfully received.

With reference to the third possible implementation of the first aspect of the embodiments of the present disclosure, in a sixth possible implementation of the first aspect of the embodiments of the present disclosure, the second indication message further includes the service data flow packet; and the method further includes:

sending, by the first gateway device, a second response message for the second indication message to the third gateway device, where the second response message is used to indicate that the second indication message has been successfully received.

A second aspect of the embodiments of the present disclosure discloses a service data flow packet transmission method. The method includes:

receiving, by a first gateway device, a service data flow packet sent by a second gateway device;

parsing, by the first gateway device, the service data flow packet, to obtain a packet processing policy for the service data flow packet; and sending, by the first gateway device, an indication message to the second gateway device when the packet processing policy is a local data flow offload policy, where the indication message includes the local data flow offload policy, and the indication message is used to instruct the second gateway device to send, according to the local data flow offload policy, the service data flow packet to a service network corresponding to the service data flow packet; or sending, by the first gateway device, the service data flow packet to the service network when the packet processing policy is not the local data flow offload policy.

In a first possible implementation of the second aspect of the embodiments of the present disclosure, the receiving, by a first gateway device, a service data flow packet sent by a second gateway device includes:

receiving, by the first gateway device, a tunnel packet sent by the second gateway device; and performing, by the first gateway device, a tunnel header decapsulation operation on the tunnel packet, to obtain the service data flow packet.

With reference to the second aspect of the embodiments of the present disclosure or the first possible implementation of the second aspect of the embodiments of the present disclosure, in a second possible implementation of the second aspect of the embodiments of the present disclosure, the parsing, by the first gateway device, the service data flow packet, to obtain a packet processing policy for the service data flow packet includes:

parsing, by the first gateway device, the service data flow packet to obtain packet characteristic information of the service data flow packet, and performing service rule matching on the service data flow packet according to the packet characteristic information, to obtain the packet processing policy.

With reference to the second aspect of the embodiments of the present disclosure, in a third possible implementation of the second aspect of the embodiments of the present disclosure, the indication message further includes the service data flow packet; and the method further includes:

receiving, by the first gateway device, a response message that is for the indication message and that is sent by the second gateway device, where the response message is used to indicate that the indication message has been successfully received.

A third aspect of the embodiments of the present disclosure discloses another service data flow packet transmission method. The method includes:

receiving, by a first gateway device, a service data flow packet sent by a second gateway device;

parsing, by the first gateway device, the service data flow packet, to obtain packet characteristic information of the service data flow packet; and sending, by the first gateway device, the packet characteristic information to a third gateway device.

In a first possible implementation of the third aspect of the embodiments of the present disclosure, the receiving, by a first gateway device, a service data flow packet sent by a second gateway device includes:

receiving, by the first gateway device, a tunnel packet sent by the second gateway device; and performing, by the first gateway device, a tunnel header decapsulation operation on the tunnel packet, to obtain the service data flow packet.

With reference to the third aspect of the embodiments of the present disclosure or the first possible implementation of the third aspect of the embodiments of the present disclosure, in a second possible implementation of the third aspect of the embodiments of the present disclosure, the method further includes:

receiving, by the first gateway device, an indication message sent by the third gateway device, and sending the indication message to the second gateway device, where the indication message includes a local data flow offload policy for the service data flow packet, and the indication message is used to instruct the second gateway device to send, according to the local data flow offload policy, the service data flow packet to a service network corresponding to the service data flow packet.

With reference to the second possible implementation of the third aspect of the embodiments of the present disclosure, in a third possible implementation of the third aspect of the embodiments of the present disclosure, the indication message further includes the service data flow packet; and the method further includes:

receiving, by the first gateway device, a response message that is for the indication message and that is sent by the second gateway device, where the response message is used to indicate that the indication message has been successfully received.

A fourth aspect of the embodiments of the present disclosure discloses still another service data flow packet transmission method. The method includes:

receiving, by a first gateway device, packet characteristic information sent by a second gateway device, where the packet characteristic information is obtained by the second gateway device by parsing a service data flow packet that is sent by a third gateway device and that is received by the second gateway device;

performing, by the first gateway device, service rule matching on the service data flow packet according to the packet characteristic information; and sending, by the first gateway device, an indication message to the third gateway device when a matched service rule corresponding to the service data flow packet instructs to perform a local data flow offload operation on the service data flow packet, where the indication message includes a local data flow offload policy for the service data flow packet, and the indication message is used to instruct the third gateway device to send, according to the local data flow offload policy, the service data flow packet to a service network corresponding to the service data flow packet.

In a first possible implementation of the fourth aspect of the embodiments of the present disclosure, the sending, by the first gateway device, an indication message to the third gateway device includes:

sending, by the first gateway device, the indication message to the third gateway device by using the second gateway device.

With reference to the fourth aspect of the embodiments of the present disclosure, in a second possible implementation of the fourth aspect of the embodiments of the present disclosure, the indication message further includes the service data flow packet; and when the first gateway device sends the indication message to the third gateway device, the method further includes:

receiving, by the first gateway device, a response message that is for the indication message and that is sent by the third gateway device, where the response message is used to indicate that the indication message has been successfully received.

A ninth aspect of the embodiments of the present disclosure discloses still another service data flow packet transmission apparatus. The apparatus includes a processor, a memory, an input interface, and an output interface, where the input interface is configured to receive a service data flow packet sent by UE;

the memory stores a set of program code, and the processor is configured to invoke the program code stored in the memory, to perform the following operation:

determining whether the service data flow packet enables a first local data flow offload policy; and the output interface is configured to send, according to the first local data flow offload policy when a determining result of the processor is yes, the service data flow packet to a service network corresponding to the service data flow packet; or the output interface is configured to send the service data flow packet to a second gateway device when the determining result of the processor is no, so that the second gateway device performs an operation corresponding to the service data flow packet.

In a first possible implementation of the ninth aspect of the embodiments of the present disclosure, a specific manner of receiving, by the input interface, a service data flow packet sent by UE is:

receiving a first tunnel packet sent by the UE; and performing a tunnel header decapsulation operation on the first tunnel packet, to obtain the service data flow packet; and a specific manner of sending, by the output interface, the service data flow packet to a second gateway device is:

performing a tunnel header encapsulation operation on the service data flow packet to obtain a second tunnel packet, and sending the second tunnel packet to the second gateway device.

With reference to the ninth aspect of the embodiments of the present disclosure or the first possible implementation of the ninth aspect of the embodiments of the present disclosure, in a second possible implementation of the ninth aspect of the embodiments of the present disclosure, the input interface is further configured to receive a first indication message sent by the second gateway device, where the first indication message includes a second local data flow offload policy for the service data flow packet, and the first indication message is used to instruct the apparatus to send the service data flow packet to the service network according to the second local data flow offload policy; and the output interface is further configured to send the service data flow packet to the service network according to the second local data flow offload policy.

With reference to the ninth aspect of the embodiments of the present disclosure or the first possible implementation of the ninth aspect of the embodiments of the present disclosure, in a third possible implementation of the ninth aspect of the embodiments of the present disclosure, the input interface is further configured to receive a second indication message sent by a third gateway device, where the second indication message includes a third local data flow offload policy, and the second indication message is used to instruct the apparatus to send the service data flow packet to the service network according to the third local data flow offload policy; and the output interface is further configured to send the service data flow packet to the service network according to the third local data flow offload policy.

With reference to the ninth aspect of the embodiments of the present disclosure or the first possible implementation of the ninth aspect of the embodiments of the present disclosure, in a fourth possible implementation of the ninth aspect of the embodiments of the present disclosure, the first local data flow offload policy is sent by the second gateway device or a third gateway device to the apparatus.

With reference to the second possible implementation of the ninth aspect of the embodiments of the present disclosure, in a fifth possible implementation of the ninth aspect of the embodiments of the present disclosure, the first indication message further includes the service data flow packet; and the output interface is further configured to send a first response message for the first indication message to the second gateway device, where the first response message is used to indicate that the first indication message has been successfully received.

With reference to the third possible implementation of the ninth aspect of the embodiments of the present disclosure, in a sixth possible implementation of the ninth aspect of the embodiments of the present disclosure, the second indication message further includes the service data flow packet; and the output interface is further configured to send a second response message for the second indication message to the third gateway device, where the second response message is used to indicate that the second indication message has been successfully received.

A tenth aspect of the embodiments of the present disclosure discloses still another service data flow packet transmission apparatus. The apparatus includes a processor, a memory, an input interface, and an output interface, where the input interface is configured to receive a service data flow packet sent by a second gateway device;

the memory stores a set of program code, and the processor is configured to invoke the program code stored in the memory, to perform the following operation:

parsing the service data flow packet, to obtain a packet processing policy for the service data flow packet; and the output interface is configured to send an indication message to the second gateway device when the packet processing policy is a local data flow offload policy, where the indication message includes the local data flow offload policy, and the indication message is used to instruct the second gateway device to send, according to the local data flow offload policy, the service data flow packet to a service network corresponding to the service data flow packet; or the output interface is configured to send the service data flow packet to the service network when the packet processing policy is not the local data flow offload policy.

In a first possible implementation of the tenth aspect of the embodiments of the present disclosure, a specific manner of receiving, by the input interface, a service data flow packet sent by a second gateway device is:

receiving a tunnel packet sent by the second gateway device, and performing a tunnel header decapsulation operation on the tunnel packet, to obtain the service data flow packet.

With reference to the tenth aspect of the embodiments of the present disclosure or the first possible implementation of the tenth aspect of the embodiments of the present disclosure, in a second possible implementation of the tenth aspect of the embodiments of the present disclosure, a specific manner of parsing, by the processor, the service data flow packet, to obtain a packet processing policy for the service data flow packet is:

parsing the service data flow packet to obtain packet characteristic information of the service data flow packet, and performing service rule matching on the service data flow packet according to the packet characteristic information, to obtain the packet processing policy.

With reference to the tenth aspect of the embodiments of the present disclosure, in a third possible implementation of the tenth aspect of the embodiments of the present disclosure, the indication message further includes the service data flow packet; and the input interface is further configured to receive a response message that is for the indication message and that is sent by the second gateway device, where the response message is used to indicate that the indication message has been successfully received.

An eleventh aspect of the embodiments of the present disclosure discloses still another service data flow packet transmission apparatus. The apparatus includes a processor, a memory, an input interface, and an output interface, where the input interface is configured to receive a service data flow packet sent by a second gateway device;

the memory stores a set of program code, and the processor is configured to invoke the program code stored in the memory, to perform the following operation:

parsing the service data flow packet, to obtain packet characteristic information of the service data flow packet; and the output interface is configured to send the packet characteristic information to a third gateway device.

In a first possible implementation of the eleventh aspect of the embodiments of the present disclosure, a specific manner of receiving, by the input interface, a service data flow packet sent by a second gateway device is:

receiving a tunnel packet sent by the second gateway device, and performing a tunnel header decapsulation operation on the tunnel packet, to obtain the service data flow packet.

With reference to the eleventh aspect of the embodiments of the present disclosure or the first possible implementation of the eleventh aspect of the embodiments of the present disclosure, in a second possible implementation of the eleventh aspect of the embodiments of the present disclosure, the input interface is further configured to receive an indication message sent by the third gateway device, where the indication message includes a local data flow offload policy for the service data flow packet, and the indication message is used to instruct the second gateway device to send, according to the local data flow offload policy, the service data flow packet to a service network corresponding to the service data flow packet; and the output interface is further configured to send the indication message to the second gateway device.

With reference to the second possible implementation of the eleventh aspect of the embodiments of the present disclosure, in a third possible implementation of the eleventh aspect of the embodiments of the present disclosure, the indication message further includes the service data flow packet; and the input interface is further configured to receive a response message that is for the indication message and that is sent by the second gateway device, where the response message is used to indicate that the indication message has been successfully received.

A twelfth aspect of the embodiments of the present disclosure discloses still another service data flow packet transmission apparatus. The apparatus includes a processor, a memory, an input interface, and an output interface, where the input interface is configured to receive packet characteristic information sent by a second gateway device, where the packet characteristic information is obtained by the second gateway device by parsing a service data flow packet that is sent by a third gateway device and that is received by the second gateway device;

the memory stores a set of program code, and the processor is configured to invoke the program code stored in the memory, to perform the following operation:

performing service rule matching on the service data flow packet according to the packet characteristic information; and the output interface is configured to send an indication message to the third gateway device when a matched service rule corresponding to the service data flow packet instructs to perform a local data flow offload operation on the service data flow packet, where the indication message includes a local data flow offload policy for the service data flow packet, and the indication message is used to instruct the third gateway device to send, according to the local data flow offload policy, the service data flow packet to a service network corresponding to the service data flow packet.

In a first possible implementation of the twelfth aspect of the embodiments of the present disclosure, a specific manner of sending, by the output interface, an indication message to the third gateway device is:

sending the indication message to the third gateway device by using the second gateway device.

With reference to the twelfth aspect of the embodiments of the present disclosure, in a second possible implementation of the twelfth aspect of the embodiments of the present disclosure, the indication message further includes the service data flow packet; and the input interface is further configured to: when the output interface sends the indication message to the third gateway device, receive a response message that is for the indication message and that is sent by the third gateway device, where the response message is used to indicate that the indication message has been successfully received.

A thirteenth aspect of the embodiments of the present disclosure discloses a service data flow packet transmission system. The system includes a user equipment (UE), a first gateway device, and a second gateway device, where the UE is configured to send a service data flow packet to the first gateway device;

the first gateway device is configured to: receive the service data flow packet sent by the UE, and determine whether the service data flow packet enables a first local data flow offload policy;

if a determining result is yes, the first gateway device sends, according to the first local data flow offload policy, the service data flow packet to a service network corresponding to the service data flow packet; or if the determining result is no, the first gateway device sends the service data flow packet to the second gateway device; and the second gateway device is configured to: receive the service data flow packet sent by the first gateway device, and perform an operation corresponding to the service data flow packet.

In a first possible implementation of the thirteenth aspect of the embodiments of the present disclosure, a specific manner of receiving, by the first gateway device, the service data flow packet sent by the UE is:

receiving a first tunnel packet sent by the UE, and performing a tunnel header decapsulation operation on the first tunnel packet, to obtain the service data flow packet; and a specific manner of sending, by the first gateway device, the service data flow packet to the second gateway device is:

performing a tunnel header encapsulation operation on the service data flow packet to obtain a second tunnel packet, and sending the second tunnel packet to the second gateway device.

With reference to the thirteenth aspect of the embodiments of the present disclosure or the first possible implementation of the thirteenth aspect of the embodiments of the present disclosure, in a second possible implementation of the thirteenth aspect of the embodiments of the present disclosure, a specific manner of performing, by the second gateway device, an operation corresponding to the service data flow packet is:

parsing the service data flow packet, to obtain a packet processing policy for the service data flow packet; and sending a first indication message to the first gateway device when the packet processing policy is a second local data flow offload policy, where the first indication message includes the second local data flow offload policy, and the first indication message is used to instruct the first gateway device to send the service data flow packet to the service network according to the second local data flow offload policy; or sending the service data flow packet to the service network when the packet processing policy is not the second local data flow offload policy; and the first gateway device is further configured to: receive the first indication message, and send the service data flow packet to the service network according to the second local data flow offload policy.

With reference to the thirteenth aspect of the embodiments of the present disclosure or the first possible implementation of the thirteenth aspect of the embodiments of the present disclosure, in a third possible implementation of the thirteenth aspect of the embodiments of the present disclosure, the system further includes a third gateway device;

a specific manner of performing, by the second gateway device, an operation corresponding to the service data flow packet is:

parsing the service data flow packet, to obtain packet characteristic information of the service data flow packet; and sending the packet characteristic information to the third gateway device;

the third gateway device is configured to: receive the packet characteristic information sent by the second gateway device; perform service rule matching on the service data flow packet according to the packet characteristic information; and send a second indication message to the first gateway device when a matched service rule corresponding to the service data flow packet instructs to perform a local data flow offload operation on the service data flow packet, where the second indication message includes a third local data flow offload policy for the service data flow packet, and the second indication message is used to instruct the first gateway device to send the service data flow packet to the service network according to the third local data flow offload policy; and the first gateway device is further configured to: receive the second indication message sent by the third gateway device, and send the service data flow packet to the service network according to the third local data flow offload policy.

With reference to the thirteenth aspect of the embodiments of the present disclosure or the first possible implementation of the thirteenth aspect of the embodiments of the present disclosure, in a fourth possible implementation of the thirteenth aspect of the embodiments of the present disclosure, the system further includes a third gateway device, and the first local data flow offload policy is sent by the second gateway device or the third gateway device to the first gateway device.

With reference to the second possible implementation of the thirteenth aspect of the embodiments of the present disclosure, in a fifth possible implementation of the thirteenth aspect of the embodiments of the present disclosure, the first indication message further includes the service data flow packet;

the first gateway device is further configured to send a first response message for the first indication message to the second gateway device, where the first response message is used to indicate that the first indication message has been successfully received; and the second gateway device is further configured to receive the first response message.

With reference to the third possible implementation of the thirteenth aspect of the embodiments of the present disclosure, in a sixth possible implementation of the thirteenth aspect of the embodiments of the present disclosure, the second indication message further includes the service data flow packet;

the first gateway device is further configured to send a second response message for the second indication message to the third gateway device, where the second response message is used to indicate that the second indication message has been successfully received; and the third gateway device is further configured to receive the second response message.

In the embodiments of the present disclosure, the first gateway device determines, after receiving the service data flow packet sent by the UE, whether the service data flow packet enables the local data flow offload policy; and if the service data flow packet enables the local data flow offload policy, the first gateway device sends, according to the local data flow offload policy, the service data flow packet to the service network corresponding to the service data flow packet; or if the service data flow packet does not enable the local data flow offload policy, the first gateway device sends the service data flow packet to the second gateway device, so that the second gateway device performs the operation corresponding to the service data flow packet. It can be learned that in the embodiments of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a service data flow packet transmission method, apparatus, and system, so as to improve flexibility in service data flow packet deployment and applicability. The following provides detailed descriptions separately.

Figure 1:
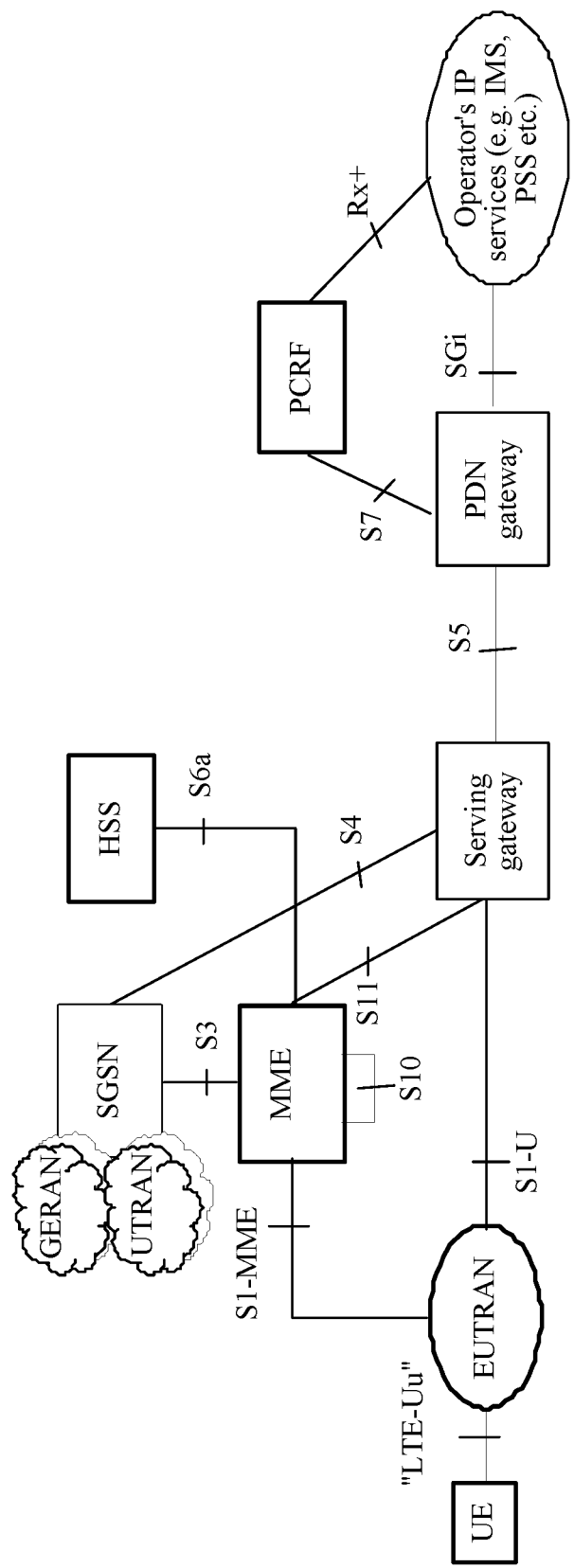
FIG. 1 is a schematic diagram of an EPS network architecture disclosed in the prior art.
Figure 2:
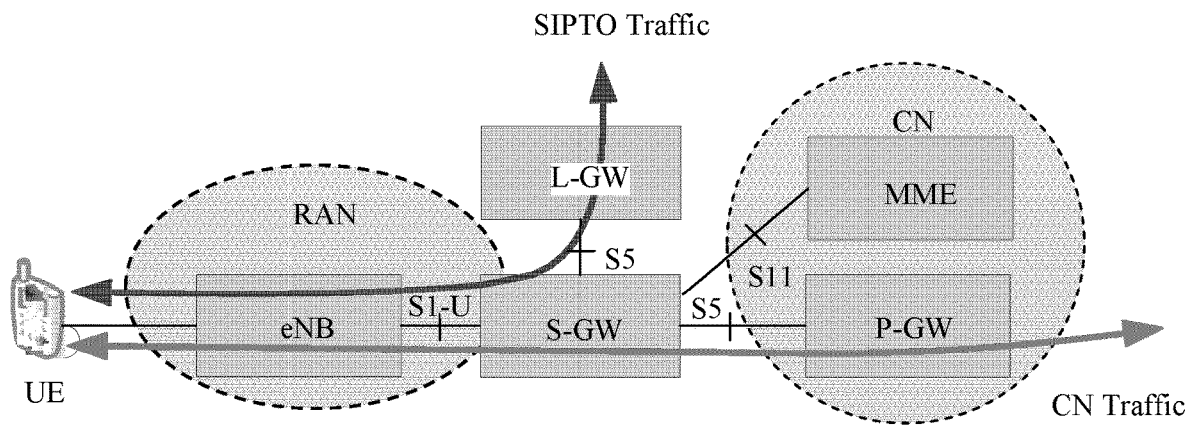
FIG. 2 is a schematic diagram of an implementation architecture of SIPTO disclosed in the prior art.
Figure 3:
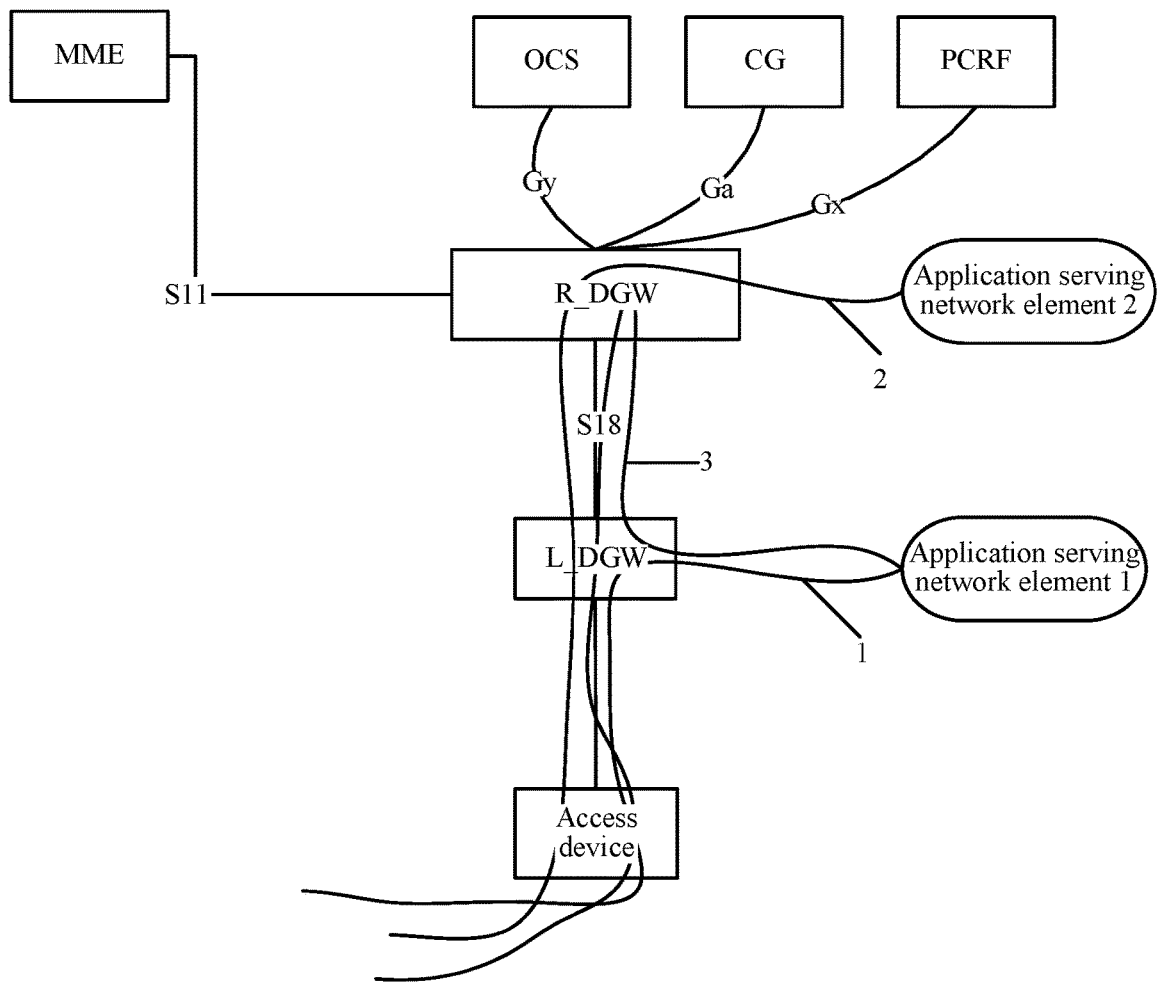
FIG. 3 is a schematic scenario diagram of an application scenario according to an embodiment of the present disclosure.

Referring to FIG. 3, FIG. 3 is a schematic scenario diagram of an application scenario according to an embodiment of the present disclosure. As shown in FIG. 3, in the application scenario, an access device, a local distributed gateway (L_DGW), a remote distributed gateway (R_DGW), and at least one application serving network element (that is, different service networks corresponding to different service data flow packets) may be included. In addition, in the application scenario, functional entities in an EPS are included, such as an MME, an online charging system (OCS), a charging gateway (CG), and a policy and charging rules function (PCRF) entity (other entities are not shown in FIG. 3). The L_DGW and the R_DGW are connected to each other by using an S18 interface. Service-related configuration information, a packet processing policy, and the like are stored in the R_DGW. The UE may establish a wireless connection to the access device in different access manners. When an access manner is 3GPP access, the access device may be specifically an evolved NodeB (eNB), a specific network element form of the R_DGW may be a PGW in the EPS, and a specific network element form of the L_DGW may be a SGW in the EPS. When an access manner is untrusted non-3GPP access (for example, WLAN access), the access device may be specifically an access point (AP), a specific network element form of the R_DGW may be a PGW, and a specific network element form of the L_DGW may be an evolved packet data gateway (ePDG). When an access manner is trusted non-3GPP access (for example, WLAN access), the access device may be specifically an AP, a specific network element form of the R_DGW may be a PGW, and a specific network element form of the L_DGW may be a trusted gateway (TGW, also called as Trusted Access Gateway). In the application scenario shown in FIG. 3, manners of transmitting a service data flow packet may include: the access device→the L_DGW→a service network (that is, a service network corresponding to the service data flow packet) (as shown by 1 in FIG. 3); the access device→the L_DGW→the R_DGW→a service network (that is, a service network corresponding to the service data flow packet) (as shown by 2 in FIG. 3); the access device→the L_DGW→the R_DGW→the L_DGW→a service network (that is, a service network corresponding to the service data flow packet) (as shown by 3 in FIG. 3).

Figure 4:
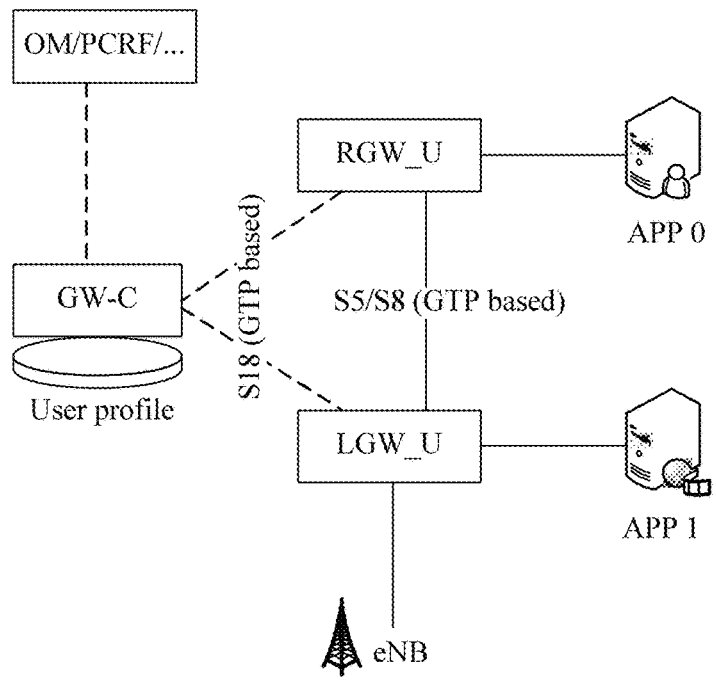
FIG. 4 is a schematic scenario diagram of another application scenario according to an embodiment of the present disclosure.

Referring to FIG. 4, FIG. 4 is a schematic scenario diagram of another application scenario according to an embodiment of the present disclosure. As shown in FIG. 4, in the application scenario, an access device, a local distributed gateway forwarding plane/user plane (L_DGW_U), a remote distributed gateway forwarding plane/user plane (R_DGW_U), a gateway control plane (GW_C), and at least one application serving network element (that is, different service networks corresponding to different service data flow packets) may be included. In addition, in the application scenario, functional entities in an EPS are included, such as an MME, an OCS, a CG, and a PCRF entity (other entities are not shown in FIG. 4). The L_DGW_U and the R_DGW_U belong to a forwarding plane, the GW_C belongs to a control plane, and the control plane and the forwarding plane are connected to each other by using an S18 interface. Service-related configuration information, a packet processing policy, and the like are stored in the GW_C. In the application scenario shown in FIG. 4, manners of transmitting a service data flow packet may include: the access device→the L_DGW_U→a service network (that is, a service network corresponding to the service data flow packet); the access device→the L_DGW_U→the R_DGW_U→the GW C→the L_DGW_U→a service network (that is, a service network corresponding to the service data flow packet); the access device→the L_DGW_U→the R_DGW_U→the GW C→the R_DGW_U→the L_DGW_U→a service network (that is, a service network corresponding to the service data flow packet).

Figure 5:
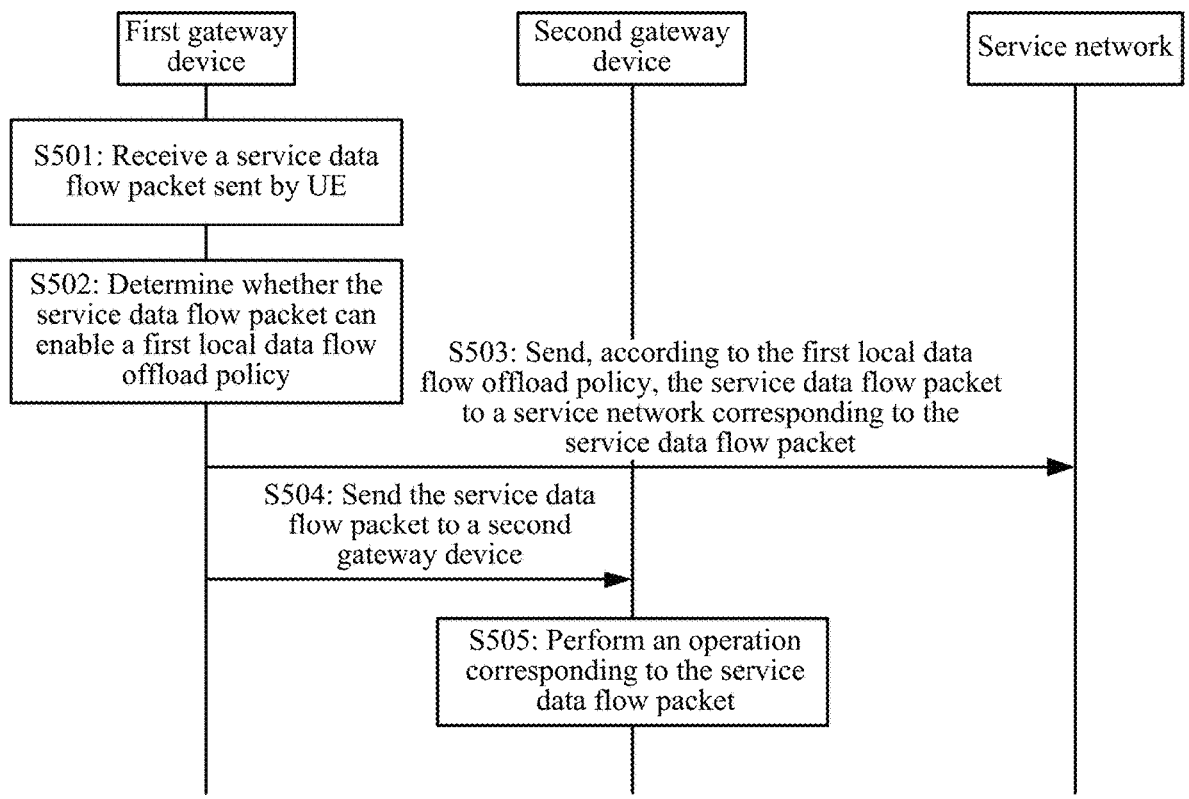
FIG. 5 is a schematic flowchart of a service data flow packet transmission method according to an embodiment of the present disclosure.

Referring to FIG. 5, FIG. 5 is a schematic flowchart of a service data flow packet transmission method according to an embodiment of the present disclosure. As shown in FIG. 5, the service data flow packet transmission method may include the following steps.

S501: A first gateway device receives a service data flow packet sent by UE.

In this embodiment of the present disclosure, specifically, when the UE has a service, the UE sends a service data flow packet of the service to an access device. Then, the access device sends the service data flow packet to the first gateway device. That is, the first gateway device receives, by using the access device, the service data flow packet sent by the UE.

Optionally, a specific manner of receiving, by the first gateway device, a service data flow packet sent by UE may be:

receiving a first tunnel packet sent by the UE, and performing a tunnel header decapsulation operation on the first tunnel packet, to obtain the service data flow packet.

In this embodiment of the present disclosure, when the first gateway device receives the service data flow packet, performing step S502 is triggered.

S502: The first gateway device determines whether the service data flow packet enables a first local data flow offload policy.

In this embodiment of the present disclosure, when a determining result in step S502 is yes, that is, when the first local data flow offload policy already exists for the service data flow packet (or the first local data flow offload policy has been valid for the service data flow packet), the first gateway device performs step S503. When the determining result in step S502 is no, that is, when no first local data flow offload policy exists for the service data flow packet, the first gateway device performs step S504.

S503: The first gateway device sends, according to the first local data flow offload policy, the service data flow packet to a service network corresponding to the service data flow packet.

In this embodiment of the present disclosure, optionally, the first local data flow offload policy prestored in the first gateway device may be sent by a second gateway device (for example, an R_DGW) or a third gateway device (for example, a GW_C) in a signaling flow (for example, a PDN connection establishment/modification flow or a dedicated bearer creation/modification flow) process, and may be included in indication information that is used to instruct the first gateway device to enforce the first local data flow offload policy for the service data flow packet and that is sent by the second gateway device or the third gateway device. Enforcing the first local data flow offload policy for the service data flow packet means sending the service data flow packet to the service network corresponding to the service data flow packet. The first local data flow offload policy prestored in the first gateway device may alternatively be sent to the first gateway device by the second gateway device, where the first local flow offload policy is a corresponding local data flow offload policy that is obtained by the second gateway device by parsing a first service data flow packet after the UE sends, when the UE initiates a service, the first service data flow packet of the service to the second gateway device by using the access device and the first gateway. This is not limited in this embodiment of the present disclosure.

S504: The first gateway device sends the service data flow packet to a second gateway device.

In this embodiment of the present disclosure, the first gateway device sends the service data flow packet to the second gateway device, to trigger the second gateway device to perform step S505.

Optionally, the sending, by the first gateway device, the service data flow packet to a second gateway device may include:

performing a tunnel header encapsulation operation that is based on a GPRS tunneling protocol (GTP) on the service data flow packet to obtain a second tunnel packet, and sending the second tunnel packet to the second gateway device.

S505: The second gateway device performs an operation corresponding to the service data flow packet.

In this embodiment of the present disclosure, specifically, after receiving the second tunnel packet sent by the first gateway device, the second gateway device performs tunnel processing (for example, GTP-based decapsulation) and service processing (for example, charging) on the second tunnel packet, and then sends the processed service data flow packet directly to the service network corresponding to the service data flow packet, or sends a first indication message for the service data flow packet to the first gateway device. The first indication message includes a second local data flow offload policy for the service data flow packet, and the first indication message is used to instruct the first gateway device to: send the service data flow packet to the service network according to the second local data flow offload policy, or send packet characteristic information obtained by parsing the service data flow packet to the third gateway device, to trigger the third gateway device to perform, according to the packet characteristic information, service rule matching on the service data flow packet. When a matched service rule corresponding to the service data flow packet instructs to perform a local data flow offload operation on the service data flow packet, the third gateway device sends a second indication message to the first gateway device directly or by using the second gateway device. The second indication message includes a third local data flow offload policy for the service data flow packet, and the second indication message is used to instruct the first gateway device to send the service data flow packet to the service network according to the third local data flow offload policy. This is not limited in this embodiment of the present disclosure.

In an optional embodiment, the service data flow packet transmission method may further include the following step:

receiving the first indication message sent by the second gateway device, and sending the service data flow packet to the service network according to the second local data flow offload policy.

Further, optionally, the first indication message may further include the service data flow packet. The service data flow packet transmission method may further include the following step:

sending, by the first gateway device, a first response message for the first indication message to the second gateway device, where the first response message is used to indicate that the first indication message has been successfully received.

In another optional embodiment, the service data flow packet transmission method may further include the following step:

receiving the second indication message that is sent by the third gateway device directly or by using the second gateway device, and sending the service data flow packet to the service network according to the third local data flow offload policy in the second indication message.

Further, optionally, the second indication message may further include the service data flow packet. The service data flow packet transmission method may further include the following steps:

sending, by the first gateway device, a second response message for the second indication message to the third gateway device when the second indication message is sent by the third gateway device directly, where the second response message is used to indicate that the second indication message has been successfully received; or sending, by the first gateway device, a second response message for the second indication message to the second gateway device when the second indication message is sent by the third gateway device by using the second gateway device.

In this embodiment of the present disclosure, the first gateway device determines, after receiving the service data flow packet sent by the UE, whether the service data flow packet enables the first local data flow offload policy; and if the service data flow packet enables the local data flow offload policy, the first gateway device sends, according to the local data flow offload policy, the service data flow packet to the service network corresponding to the service data flow packet; or if the service data flow packet does not enable the local data flow offload policy, the first gateway device sends the service data flow packet to the second gateway device, so that the second gateway device performs the operation corresponding to the service data flow packet. It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 6:
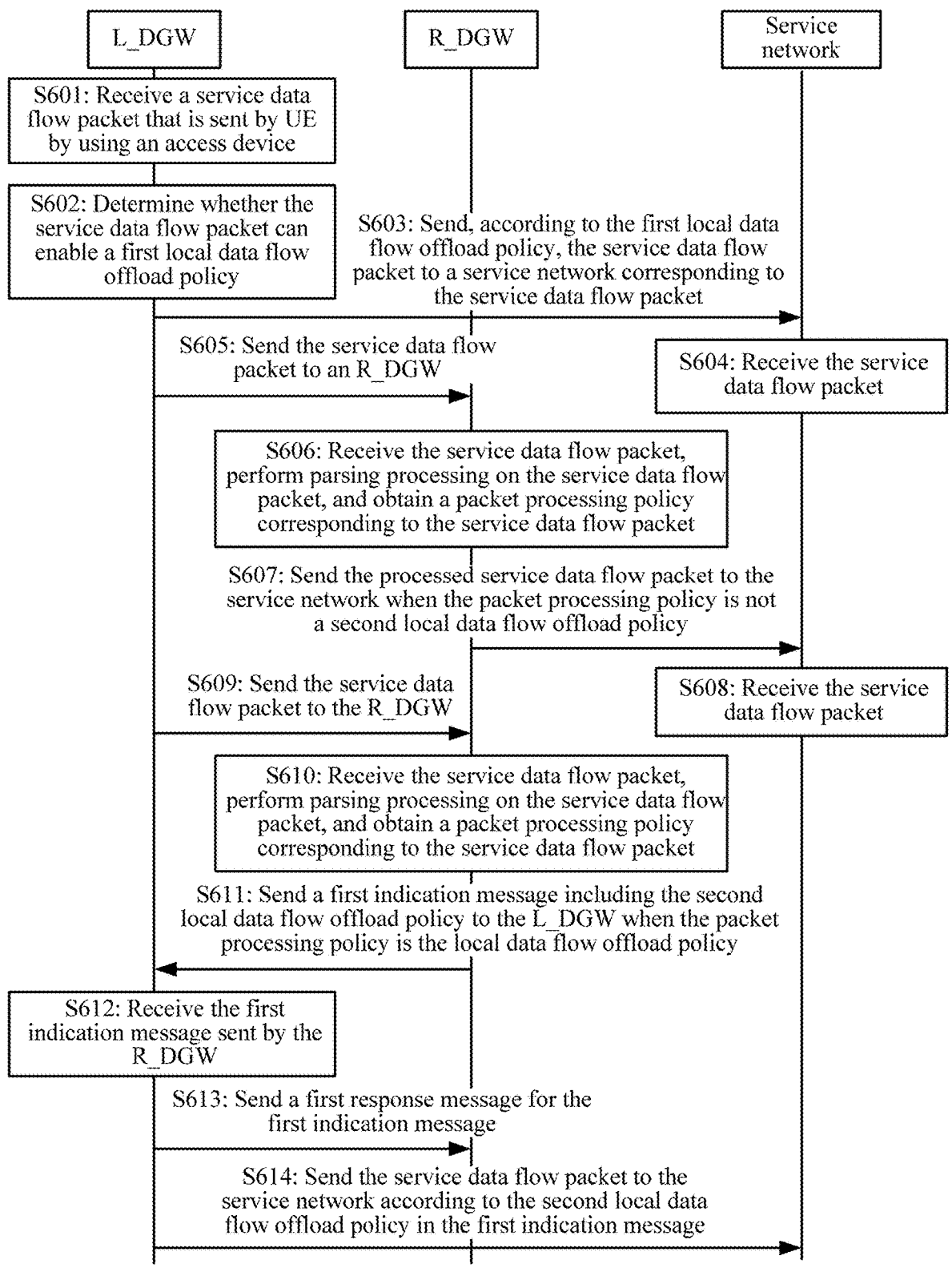
FIG. 6 is a schematic flowchart of another service data flow packet transmission method according to an embodiment of the present disclosure.

Referring to FIG. 6, FIG. 6 is a schematic flowchart of another service data flow packet transmission method according to an embodiment of the present disclosure. As shown in FIG. 6, the method is applicable to the application scenario shown in FIG. 3. That is, in the method shown in FIG. 6, that a first gateway device is an L_DGW and a second gateway device is an R_DGW is used as an example. As shown in FIG. 6, the method may include the following steps.

S601: The L_DGW receives a service data flow packet that is sent by UE by using an access device.

Specifically, the L_DGW receives the service data flow packet by using an S1_U interface.

S602: The L_DGW determines whether the service data flow packet enables a first local data flow offload policy.

In this embodiment of the present disclosure, when a determining result in step S602 is yes, performing step S603 and step S604 is triggered. When the determining result in step S602 is no, performing step S605 to step S608 may be triggered, or performing step S609 to step S614 may be triggered. This is not limited in this embodiment of the present disclosure.

S603: The L_DGW sends, according to the first local data flow offload policy, the service data flow packet to a service network corresponding to the service data flow packet.

S604: The service network receives the service data flow packet.

S605: The L_DGW sends the service data flow packet to the R_DGW.

Specifically, the L_DGW performs GTP-based decapsulation and encapsulation on the service data flow packet to obtain a GTP tunnel packet, and sends the GTP tunnel packet to the R_DGW by using S5/S8.

S606: The R_DGW receives the service data flow packet sent by the L_DGW, performs parsing processing on the service data flow packet, and obtains a packet processing policy corresponding to the service data flow packet.

Specifically, the R_DGW receives the GTP tunnel packet by using an S1/S8 interface, parses the GTP tunnel packet to obtain corresponding packet characteristic information, and performs service rule matching according to the packet characteristic information. A matched service rule corresponding to the service data flow packet includes a series of operations (such as a QoS operation, a charging operation, and a header enrichment operation). When an operation in the corresponding service rule is a local data flow offload operation that needs to be performed on the service data flow packet, the R_DGW can determine that the packet processing policy is a local data flow offload policy. That is, a local breakout (LBO) characteristic is activated. When none of the operations in the corresponding service rule is a local data flow offload operation that needs to be performed on the service data flow packet, the R_DGW can determine that the packet processing policy is not the local data flow offload policy.

In this embodiment of the present disclosure, for example, the R_DGW may perform service rule matching according to L3/L4 characteristic information (for example, IP 5-tuple information and a differentiated services code point DSCP) of the service data flow packet. If the matched service rule indicates that layer L7 matching further needs to be performed, L7 deep packet inspection (DPI) is performed, and layer L7 characteristic information may be obtained by continually performing DPI on a received packet. The obtained layer L7 characteristic information continues to be used for matching with a service rule set for which L3/L4 characteristic information is successfully matched, so as to obtain a service rule with a highest priority.

Optionally, the R_DGW may save a mapping relationship between a matched service rule and a packet 5-tuple to the R_DGW, so that the R_DGW can obtain a corresponding service rule (that is, a series of operations) directly through matching when packets having a same 5-tuple are received subsequently.

S607: The R_DGW sends the processed service data flow packet to the service network when the packet processing policy is not a second local data flow offload policy.

S608: The service network receives the processed service data flow packet.

S609: The L_DGW sends the service data flow packet to the R_DGW.

S610: The R_DGW receives the service data flow packet sent by the L_DGW, performs parsing processing on the service data flow packet, and obtains a packet processing policy corresponding to the service data flow packet.

S611: The R_DGW sends a first indication message including the second local data flow offload policy to the L_DGW when the packet processing policy is the second local data flow offload policy.

In this embodiment of the present disclosure, the first indication message may further include the service data flow packet. This is not limited in this embodiment of the present disclosure.

In this embodiment of the present disclosure, that the R_DGW sends a first indication message including the second local data flow offload policy to the L_DGW implements that the R_DGW sends the second local data flow offload policy to the L_DGW when the packet processing policy is the second local data flow offload policy.

S612: The L_DGW receives the first indication message sent by the R_DGW.

In this embodiment of the present disclosure, the L_DGW stores the second local data flow offload policy in the first indication message. When another service data flow packet that enables the second local data flow offload policy is received subsequently, the L_DGW may send the received another service data flow packet directly to the corresponding service network.

S613: The L_DGW sends a first response message for the first indication message to the R_DGW.

The first response message is used to indicate that the first indication message has been successfully received by the L_DGW.

S614: The L_DGW sends the service data flow packet to the corresponding service network according to the second local data flow offload policy in the first indication message.

It should be noted that step S613 is an optional step.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 7A:
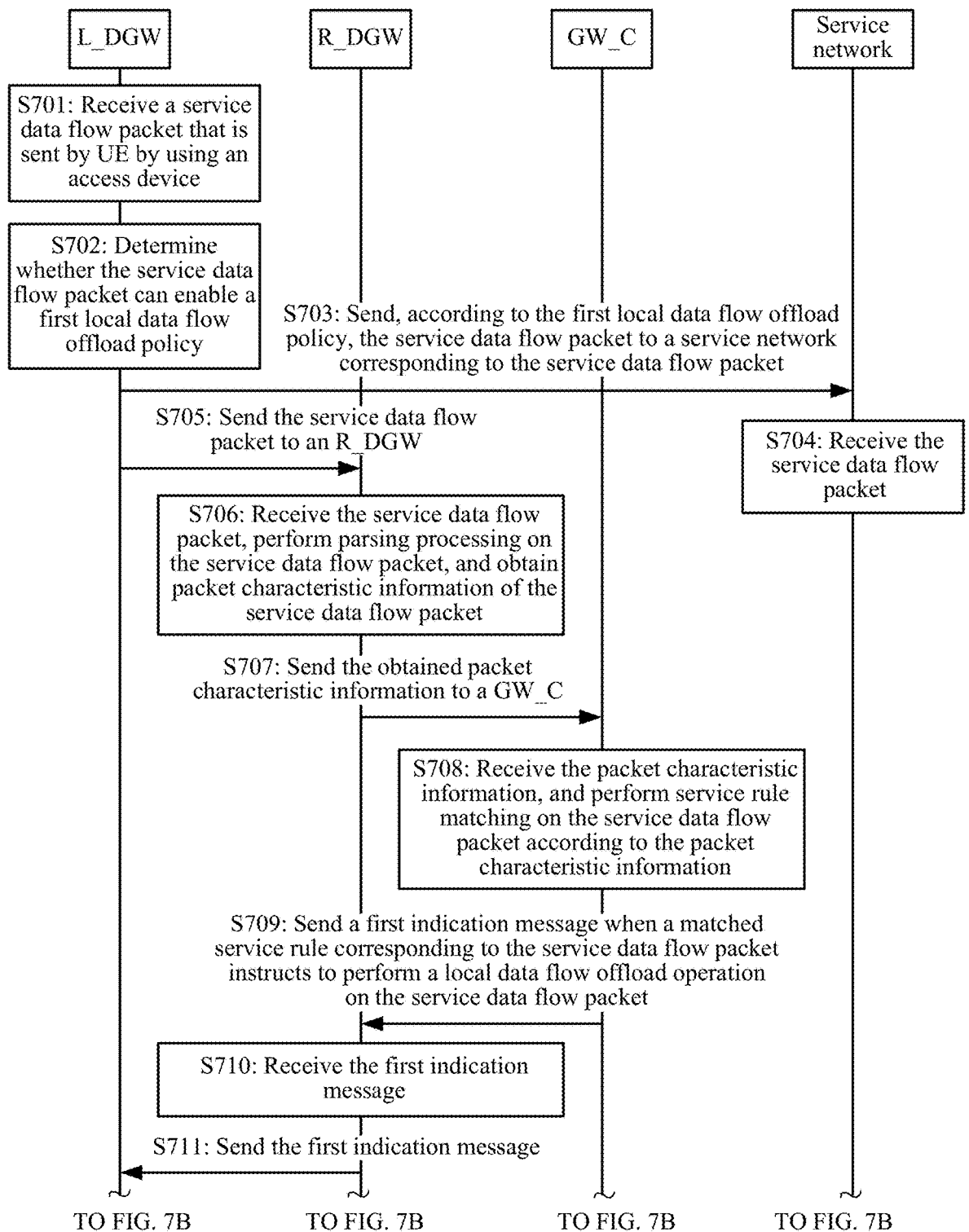
FIG. 7A and FIG. 7B are a schematic flowchart of still another service data flow packet transmission method according to an embodiment of the present disclosure.
Figure 7B:
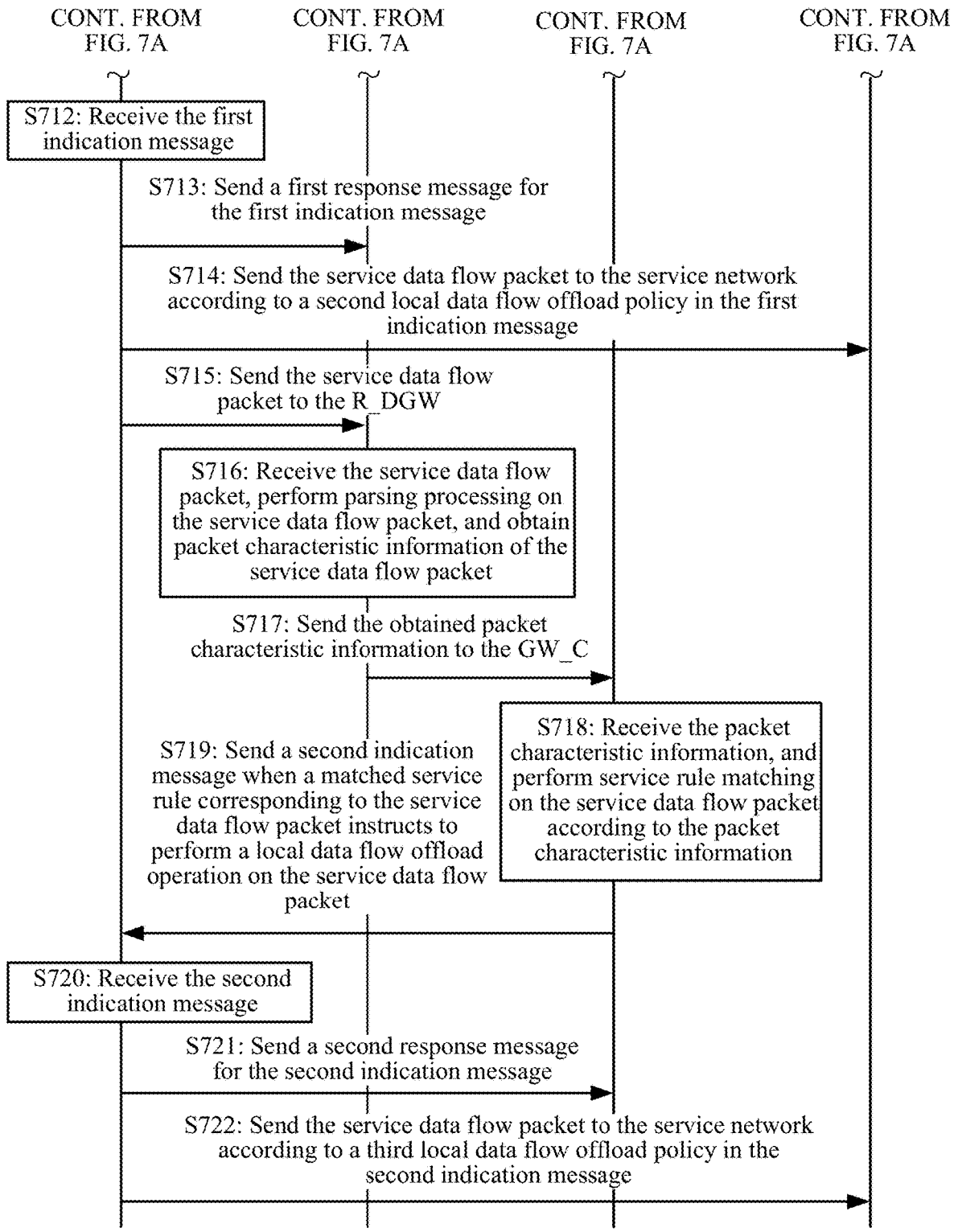

Referring to FIG. 7A and FIG. 7B, FIG. 7A and FIG. 7B are a schematic flowchart of still another service data flow packet transmission method according to an embodiment of the present disclosure. As shown in FIG. 7A and FIG. 7B, the method is applicable to the application scenario shown in FIG. 4. That is, in the method shown in FIG. 7A and FIG. 7B, that a first gateway device is an L_DGW, a second gateway device is an R_DGW, and a third gateway device is a GW_C is used as an example. As shown in FIG. 7A and FIG. 7B, the method may include the following steps. Step S701 to step S704 are corresponding to step S601 to step S604 in FIG. 6 respectively. Details are not described in this embodiment of the present disclosure. It should be noted that the L_DGW is the L_DGW_U in FIG. 4, and the R_DGW is the R_DGW_U in FIG. 4. When a determining result in step S702 is yes, performing step S703 and step S704 is triggered. When the determining result in step S702 is no, performing step S705 to step S714 may be triggered, or performing step S715 to step S722 may be triggered. This is not limited in this embodiment of the present disclosure.

S705: The L_DGW sends the service data flow packet to the R_DGW.

S706: The R_DGW receives the service data flow packet sent by the L_DGW, performs parsing processing on the service data flow packet, and obtains packet characteristic information of the service data flow packet.

S707: The R_DGW sends the obtained packet characteristic information to the GW_C.

Specifically, the R_DGW may report the packet characteristic information to the GW_C by using a packet identification report (PIR) message.

S708: The GW_C receives the packet characteristic information sent by the R-DGW, and performs service rule matching on the service data flow packet according to the packet characteristic information.

S709: The GW_C sends a first indication message to the R_DGW when a matched service rule corresponding to the service data flow packet instructs to perform a local data flow offload operation on the service data flow packet.

The first indication message includes a second local data flow offload policy, and the first indication message is used to instruct the L_DGW to send the service data flow packet to the service network according to the second local data flow offload policy.

S710: The R_DGW receives the first indication message sent by the GW_C.

S711: The R_DGW sends the first indication message to an L_DGW.

S712: The L_DGW receives the first indication message sent by the R_DGW.

S713: The L_DGW sends a first response message for the first indication message to the R_DGW.

The first response message is used to indicate that the first indication message has been successfully received.

S714: The L_DGW sends the service data flow packet to the service network according to a second local data flow offload policy in the first indication message.

S715: The L_DGW sends the service data flow packet to the R_DGW.

S716: The R_DGW receives the service data flow packet sent by the L_DGW, performs parsing processing on the service data flow packet, and obtains packet characteristic information of the service data flow packet.

S717: The R_DGW sends the obtained packet characteristic information to the GW_C.

Specifically, the R_DGW may report the packet characteristic information to the GW_C by using a PIR message.

S718: The GW_C receives the packet characteristic information sent by the R_DGW, and performs service rule matching on the service data flow packet according to the packet characteristic information.

S719: The GW_C sends a second indication message to the L_DGW when a matched service rule corresponding to the service data flow packet instructs to perform a local data flow offload operation on the service data flow packet.

The second indication message includes a third local data flow offload policy, and the second indication message is used to instruct the L_DGW to send the service data flow packet to the corresponding service network according to the third local data flow offload policy.

S720: The L_DGW receives the second indication message sent by the GW_C.

S721: The L_DGW sends a second response message for the second indication message to the R_DGW.

The second response message is used to indicate that the second indication message has been successfully received.

S722: The L_DGW sends the service data flow packet to the corresponding service network according to a third local data flow offload policy in the second indication message.

It should be noted that both step S713 and step 721 are optional.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 8:
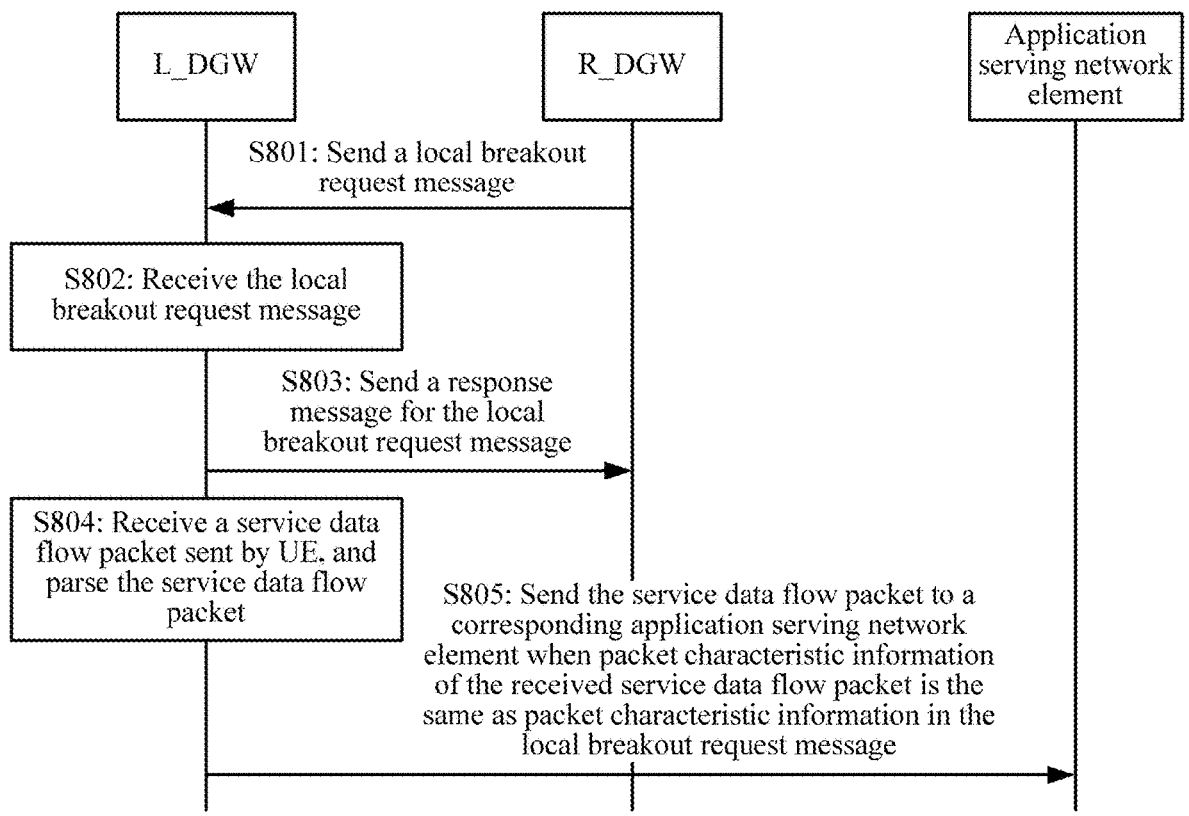
FIG. 8 is a schematic flowchart of still another service data flow packet transmission method according to an embodiment of the present disclosure.

Referring to FIG. 8, FIG. 8 is a schematic flowchart of still another service data flow packet transmission method according to an embodiment of the present disclosure. As shown in FIG. 8, the method is applicable to the application scenario shown in FIG. 3. That is, in the method shown in FIG. 8, that a first gateway device is an L_DGW and a second gateway device is an R_DGW is used as an example. As shown in FIG. 8, the method may include the following steps.

S801: The R_DGW sends a local breakout request message to the L_DGW.

Specifically, the R_DGW sends a local breakout request message to the L_DGW by using an S5/S8 interface in a signaling flow (a PDN connection establishment/modification flow or a dedicated bearer creation/modification flow) process. The message carries packet characteristic information (for example, a packet 5-tuple) and is used to instruct to perform a local data flow offload operation on a service data flow packet corresponding to the packet characteristic information.

S802: The L_DGW receives the local breakout request message sent by the R_DGW.

S803: The L_DGW sends a response message for the local breakout request message to the R_DGW.

The response message is used to indicate that the local breakout request message has been successfully received.

S804: The L_DGW receives a service data flow packet sent by UE, and parses the service data flow packet.

S805: The L_DGW sends the service data flow packet to a corresponding service network when packet characteristic information of the received service data flow packet is the same as packet characteristic information in the local breakout request message.

In this embodiment of the present disclosure, the L_DGW sends the service data flow packet to the R_DGW when the packet characteristic information of the received service data flow packet is not the same as the packet characteristic information in the local breakout request message, so that the R_DGW performs a corresponding operation.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 9:
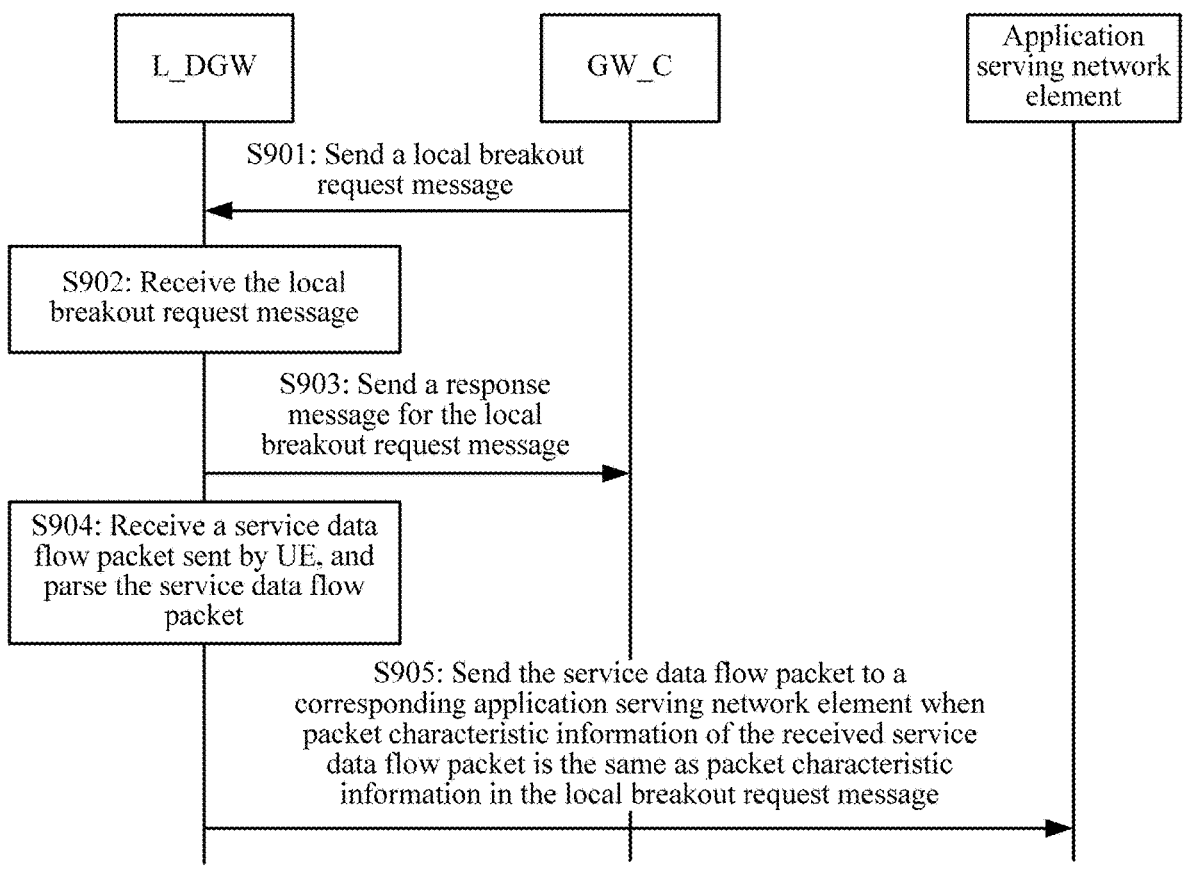
FIG. 9 is a schematic flowchart of still another service data flow packet transmission method according to an embodiment of the present disclosure.

Referring to FIG. 9, FIG. 9 is a schematic flowchart of still another service data flow packet transmission method according to an embodiment of the present disclosure. As shown in FIG. 9, the method is applicable to the application scenario shown in FIG. 4. That is, in the method shown in FIG. 9, that a first gateway device is an L_DGW, a second gateway device is an R_DGW, and a third gateway device is a GW_C is used as an example. As shown in FIG. 9, the method may include the following steps.

S901: The GW_C sends a local breakout request message to the L_DGW.

Specifically, the GW_C sends a local breakout request message to the L_DGW by using an S18 interface in a signaling flow (a PDN connection establishment/modification flow or a dedicated bearer creation/modification flow) process. The message carries packet characteristic information (for example, a packet 5-tuple) and is used to instruct to perform a local data flow offload operation on a service data flow packet corresponding to the packet characteristic information.

S902: The L_DGW receives the local breakout request message sent by the GW_C.

S903: The L_DGW sends a response message for the local breakout request message to the GW_C.

The response message is used to indicate that the local breakout request message has been successfully received.

S904: The L_DGW receives a service data flow packet sent by UE, and parses the service data flow packet.

S905: The L_DGW sends the service data flow packet to a corresponding service network when packet characteristic information of the received service data flow packet is the same as packet characteristic information in the local breakout request message.

In this embodiment of the present disclosure, the L_DGW sends the service data flow packet to the R_DGW when the packet characteristic information of the received service data flow packet is the same as the packet characteristic information in the local breakout request message, so that the R_DGW performs a corresponding operation.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 10:
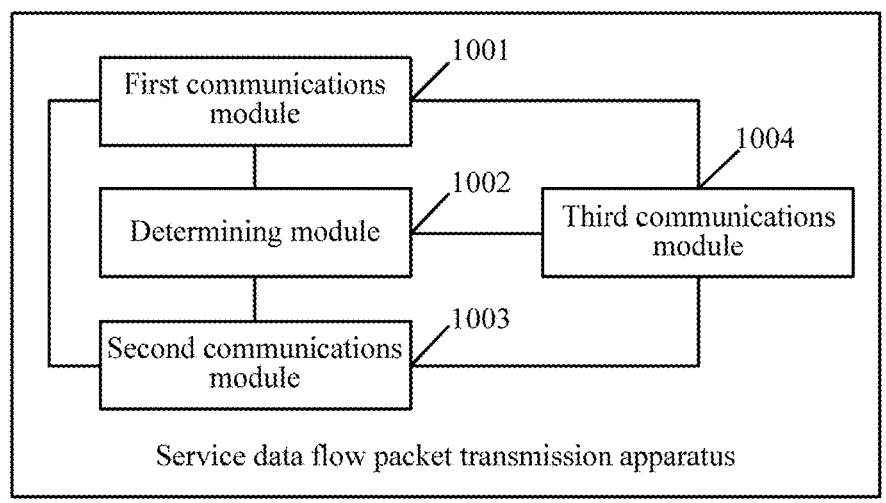
FIG. 10 is a schematic structural diagram of a service data flow packet transmission apparatus according to an embodiment of the present disclosure.

Referring to FIG. 10, FIG. 10 is a schematic structural diagram of a service data flow packet transmission apparatus according to an embodiment of the present disclosure. The apparatus shown in FIG. 10 may be an L_DGW. As shown in FIG. 10, the apparatus may include a first communications module 1001, a determining module 1002, a second communications module 1003, and a third communications module 1004.

The first communications module 1001 is configured to receive a service data flow packet sent by UE.

The determining module 1002 is configured to determine whether the service data flow packet enables a first local data flow offload policy.

Optionally, the first local data flow offload policy is sent by a second gateway device or a third gateway device to the apparatus shown in FIG. 10 in a signaling flow process.

The second communications module 1003 is configured to send, according to the first local data flow offload policy when a determining result of the determining module 1002 is yes, the service data flow packet to a service network corresponding to the service data flow packet.

The third communications module 1004 is configured to send the service data flow packet to the second gateway device when the determining result of the determining module 1002 is no, so that the second gateway device performs an operation corresponding to the service data flow packet.

Figure 11:
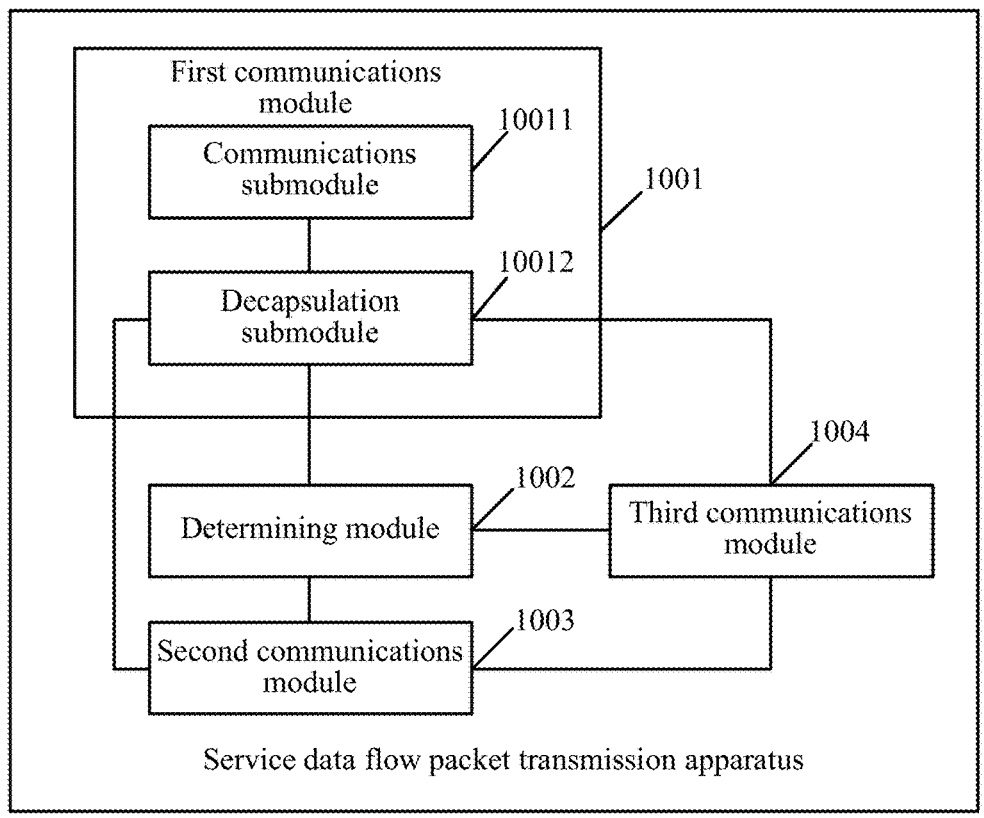
FIG. 11 is a schematic structural diagram of another service data flow packet transmission apparatus according to an embodiment of the present disclosure.

In an optional embodiment, the first communications module 1001 may include a communications submodule 10011 and a decapsulation submodule 10012. In this case, a structure of the apparatus may be shown in FIG. 11. FIG. 11 is a schematic structural diagram of another service data flow packet transmission apparatus according to an embodiment of the present disclosure.

The communications submodule 10011 is configured to receive a first tunnel packet sent by the UE.

The decapsulation submodule 10012 is configured to perform a tunnel header decapsulation operation on the first tunnel packet, to obtain the service data flow packet.

In the optional embodiment, a specific manner of sending, by the third communications module 1004, the service data flow packet to the second gateway device is:

performing a tunnel header encapsulation operation on the service data flow packet to obtain a second tunnel packet, and sending the second tunnel packet to the second gateway device.

In another optional embodiment, the third communications module 1004 may be further configured to receive a first indication message sent by the second gateway device. The first indication message includes a second local data flow offload policy for the service data flow packet, and the first indication message is used to instruct the apparatus shown in FIG. 11 to send the service data flow packet to the corresponding service network according to the second local data flow offload policy.

In the another optional embodiment, the second communications module 1003 may be further configured to send the service data flow packet to the corresponding service network according to the second local data flow offload policy.

Further, optionally, the first indication message may further include the service data flow packet. The third communications module 1004 may be further configured to send a first response message for the first indication message to the second gateway device. The first response message is used to indicate that the first indication message has been successfully received.

Figure 12:
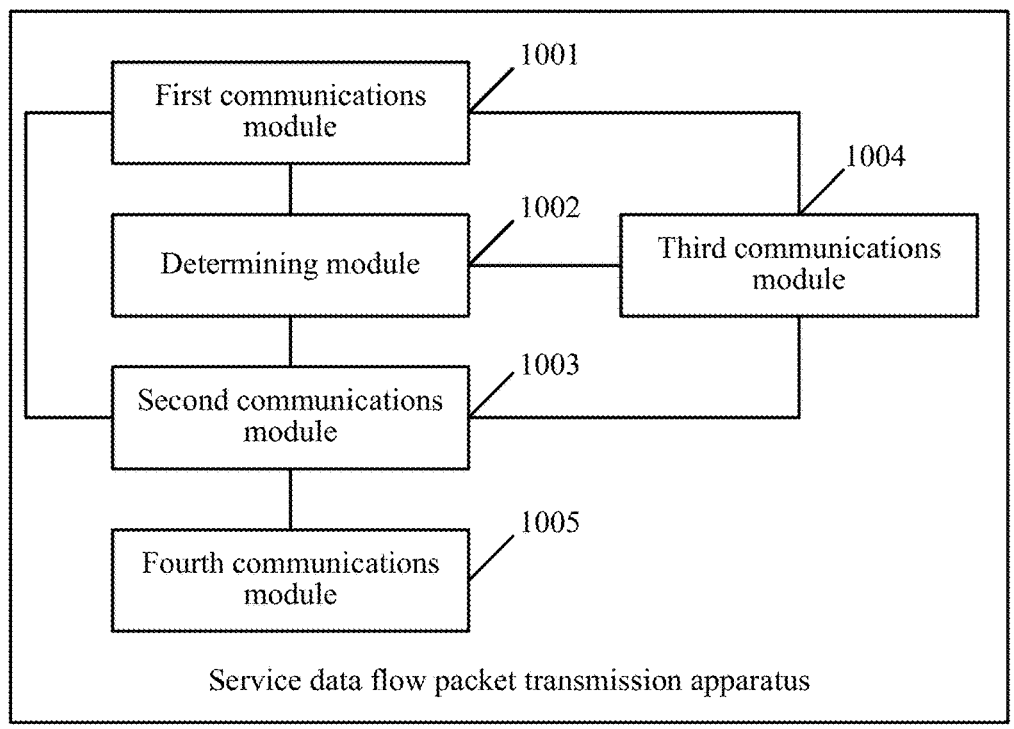
FIG. 12 is a schematic structural diagram of still another service data flow packet transmission apparatus according to an embodiment of the present disclosure.

In still another optional embodiment, based on the apparatus structure shown in FIG. 10, the apparatus may further include a fourth communications module 1005. In this case, a structure of the apparatus may be shown in FIG. 12. FIG. 12 is a schematic structural diagram of still another service data flow packet transmission apparatus according to an embodiment of the present disclosure.

The fourth communications module 1005 is configured to receive a second indication message sent by the third gateway device. The second indication message includes a third local data flow offload policy, and the second indication message is used to instruct the apparatus shown in FIG. 12 to send the service data flow packet to the corresponding service network according to the third local data flow offload policy. The second communications module 1003 may be further configured to send the service data flow packet to the corresponding service network according to the third local data flow offload policy.

Further, optionally, the second indication message further includes the service data flow packet. The fourth communications module 1005 may be further configured to send a second response message for the second indication message to the third gateway device. The second response message is used to indicate that the second indication message has been successfully received.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 13:
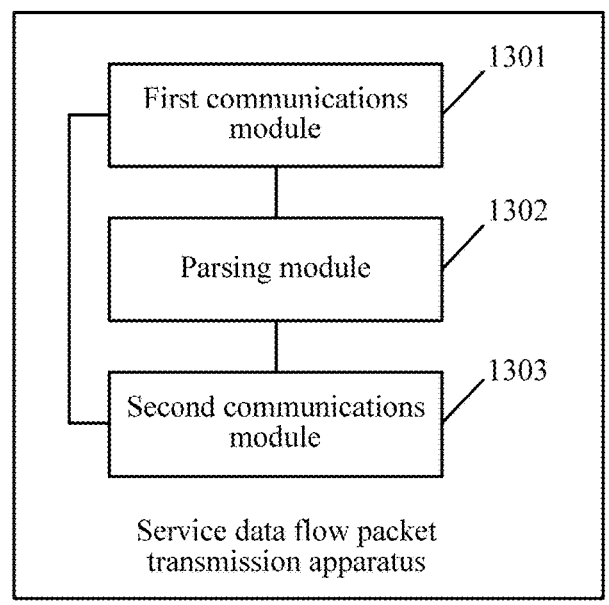
FIG. 13 is a schematic structural diagram of still another service data flow packet transmission apparatus according to an embodiment of the present disclosure.

Referring to FIG. 13, FIG. 13 is a schematic structural diagram of still another service data flow packet transmission apparatus according to an embodiment of the present disclosure. The apparatus shown in FIG. 13 may be an R_DGW. As shown in FIG. 13, the apparatus may include a first communications module 1301, a parsing module 1302, and a second communications module 1303.

In a first embodiment, the first communications module 1301 is configured to receive a service data flow packet sent by a second gateway device.

The parsing module 1302 is configured to parse the service data flow packet, to obtain a packet processing policy for the service data flow packet.

The first communications module 1301 is further configured to send an indication message to the second gateway device when the packet processing policy is a local data flow offload policy. The indication message includes the local data flow offload policy, and the indication message is used to instruct the second gateway device to send, according to the local data flow offload policy, the service data flow packet to a service network corresponding to the service data flow packet.

The second communications module 1303 is configured to send the service data flow packet to the corresponding service network when the packet processing policy is not the local data flow offload policy.

In a second embodiment, the first communications module 1301 is configured to receive a service data flow packet sent by a second gateway device.

The parsing module 1302 is configured to parse the service data flow packet, to obtain packet characteristic information of the service data flow packet.

The second communications module 1303 is configured to send the packet characteristic information to a third gateway device.

Figure 14:
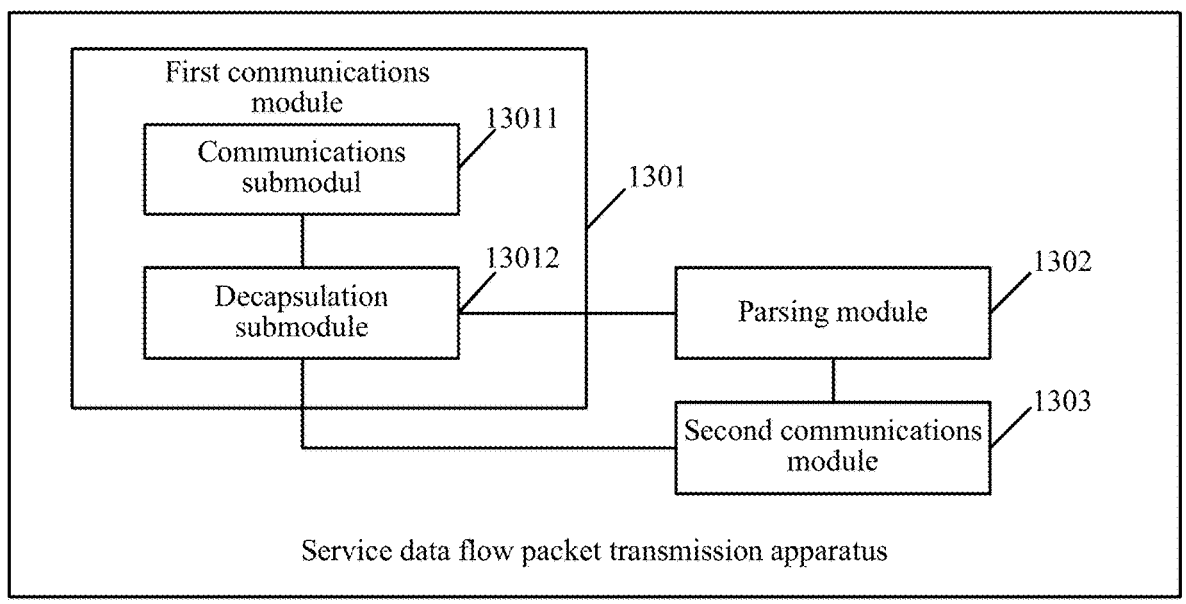
FIG. 14 is a schematic structural diagram of still another service data flow packet transmission apparatus according to an embodiment of the present disclosure.

Optionally, as shown in FIG. 14, the first communications module 1301 may include a communications submodule 13011 and a decapsulation submodule 13012. FIG. 14 is a schematic structural diagram of still another service data flow packet transmission apparatus according to an embodiment of the present disclosure.

The communications submodule 13011 is configured to receive a tunnel packet sent by the second gateway device.

The decapsulation submodule 13012 is configured to perform a tunnel header decapsulation operation on the tunnel packet, to obtain the service data flow packet.

In the first embodiment, optionally, a specific manner of parsing, by the parsing module 1302, the service data flow packet, to obtain a packet processing policy for the service data flow packet is:

parsing the service data flow packet to obtain packet characteristic information of the service data flow packet, and performing service rule matching on the service data flow packet according to the packet characteristic information, to obtain the packet processing policy.

In the first embodiment, optionally, the indication message may further include the service data flow packet. The first communications module 1301 may be further configured to receive a response message that is for the indication message and that is sent by the second gateway device. The response message is used to indicate that the indication message has been successfully received.

In the second embodiment, optionally, the second communications module 1303 may be further configured to receive an indication message sent by the third gateway device. The indication message includes a local data flow offload policy for the service data flow packet, and the indication message is used to instruct the second gateway device to send, according to the local data flow offload policy, the service data flow packet to a service network corresponding to the service data flow packet. The first communications module 1301 may be further configured to send the indication message to the second gateway device.

In the second embodiment, further, optionally, the indication message may further include the service data flow packet. The first communications module 1301 may be further configured to receive a response message that is for the indication message and that is sent by the second gateway device. The response message is used to indicate that the indication message has been successfully received.

It can be learned that in this embodiment of the present disclosure, UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 15:
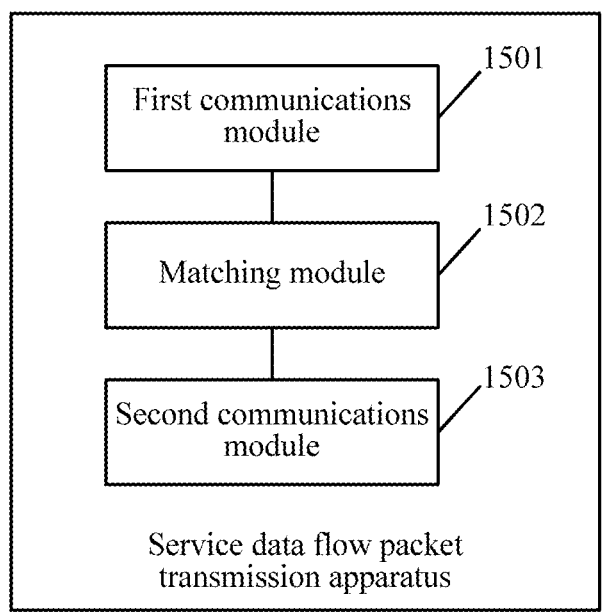
FIG. 15 is a schematic structural diagram of still another service data flow packet transmission apparatus according to an embodiment of the present disclosure.

Referring to FIG. 15, FIG. 15 is a schematic structural diagram of still another service data flow packet transmission apparatus according to an embodiment of the present disclosure. The apparatus shown in FIG. 15 may be a GW_C. As shown in FIG. 15, the apparatus may include a first communications module 1501, a matching module 1502, and a second communications module 1503.

The first communications module 1501 is configured to receive packet characteristic information sent by a second gateway device. The packet characteristic information is obtained by the second gateway device by parsing a service data flow packet that is sent by a third gateway device and that is received by the second gateway device.

The matching module 1502 is configured to perform service rule matching on the service data flow packet according to the packet characteristic information.

The second communications module 1503 is configured to send an indication message to the third gateway device when a matched service rule corresponding to the service data flow packet instructs to perform a local data flow offload operation on the service data flow packet. The indication message includes a local data flow offload policy for the service data flow packet, and the indication message is used to instruct the third gateway device to send, according to the local data flow offload policy, the service data flow packet to a service network corresponding to the service data flow packet.

Optionally, a specific manner of sending, by the second communications module 1503, an indication message to the third gateway device is:

sending the indication message to the third gateway device directly; or sending the indication message to the third gateway device by using the second gateway device.

Further, optionally, the indication message further includes the service data flow packet. The second communications module 1503 may be further configured to: when sending the indication message to the third gateway device directly, receive a response message that is for the indication message and that is sent by the third gateway device. The response message is used to indicate that the indication message has been successfully received.

It can be learned that in this embodiment of the present disclosure, UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 16:
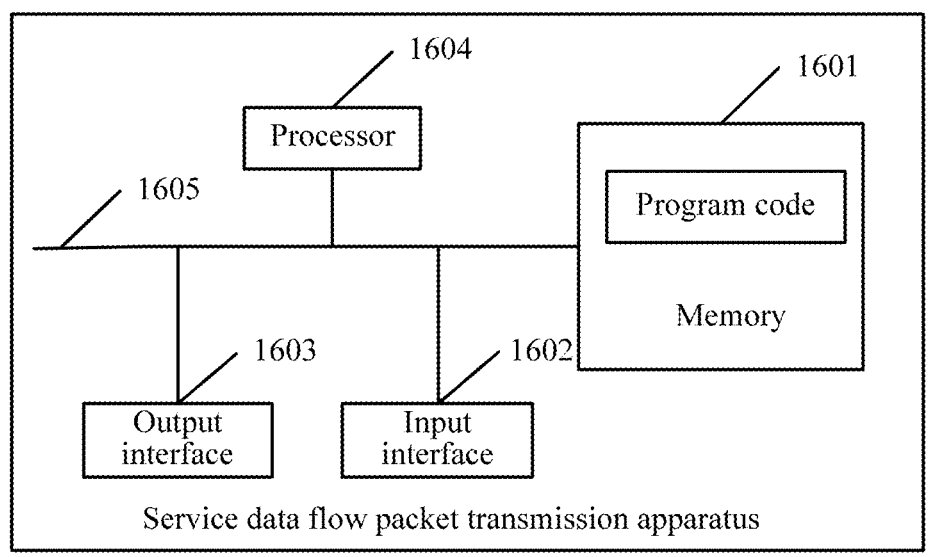
FIG. 16 is a schematic structural diagram of still another service data flow packet transmission apparatus according to an embodiment of the present disclosure.

Referring to FIG. 16, FIG. 16 is a schematic structural diagram of still another service data flow packet transmission apparatus according to an embodiment of the present disclosure. As shown in FIG. 16, the apparatus may include a memory 1601, an input interface 1602, an output interface 1603, at least one processor 1604 (for example, a CPU), and at least one communications bus 1605. The memory 1601 may be a high-speed RAM, or may be a non-volatile memory, for example, at least one magnetic disk memory. Optionally, the memory 1601 may alternatively be at least one storage apparatus located away from the processor 1604.

The communications bus 1605 is configured to implement a connection and communication between the components.

The input interface 1602 is configured to receive a service data flow packet sent by UE.

The memory 1601 stores a set of program code, and the processor 1604 invokes the program code stored in the memory 1601, to perform the following operation:

determining whether the service data flow packet enables a first local data flow offload policy.

The output interface 1603 is configured to send, according to the first local data flow offload policy when a determining result of the processor 1604 is yes, the service data flow packet to a service network corresponding to the service data flow packet.

The output interface 1603 is configured to send the service data flow packet to a second gateway device when the determining result of the processor 1604 is no, so that the second gateway device performs an operation corresponding to the service data flow packet.

In an optional embodiment, a specific manner of receiving, by the input interface 1602, a service data flow packet sent by UE may be:

receiving a first tunnel packet sent by the UE; and performing a tunnel header decapsulation operation on the first tunnel packet, to obtain the service data flow packet.

A specific manner of sending, by the output interface 1603, the service data flow packet to a second gateway device may be:

performing a tunnel header encapsulation operation on the service data flow packet to obtain a second tunnel packet, and sending the second tunnel packet to the second gateway device.

In another optional embodiment, the input interface 1602 may be further configured to receive a first indication message sent by the second gateway device. The first indication message includes a second local data flow offload policy for the service data flow packet, and the first indication message is used to instruct the apparatus shown in FIG. 16 to send the service data flow packet to the corresponding service network according to the second local data flow offload policy.

The output interface 1603 may be further configured to send the service data flow packet to the corresponding service network according to the second local data flow offload policy.

Optionally, the first indication message further includes the service data flow packet. The output interface 1603 may be further configured to send a first response message for the first indication message to the second gateway device. The first response message is used to indicate that the first indication message has been successfully received.

In still another optional embodiment, the input interface 1602 may be further configured to receive a second indication message sent by a third gateway device. The second indication message includes a third local data flow offload policy, and the second indication message is used to instruct the apparatus shown in FIG. 16 to send the service data flow packet to the service network according to the third local data flow offload policy.

The output interface 1603 may be further configured to send the service data flow packet to the corresponding service network according to the third local data flow offload policy.

Optionally, the second indication message may further include the service data flow packet. The output interface 1603 may be further configured to send a second response message for the second indication message to the third gateway device. The second response message is used to indicate that the second indication message has been successfully received.

In an embodiment, the first local data flow offload policy is sent by the second gateway device or the third gateway device to the apparatus shown in FIG. 16 in a signaling flow process.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 17:
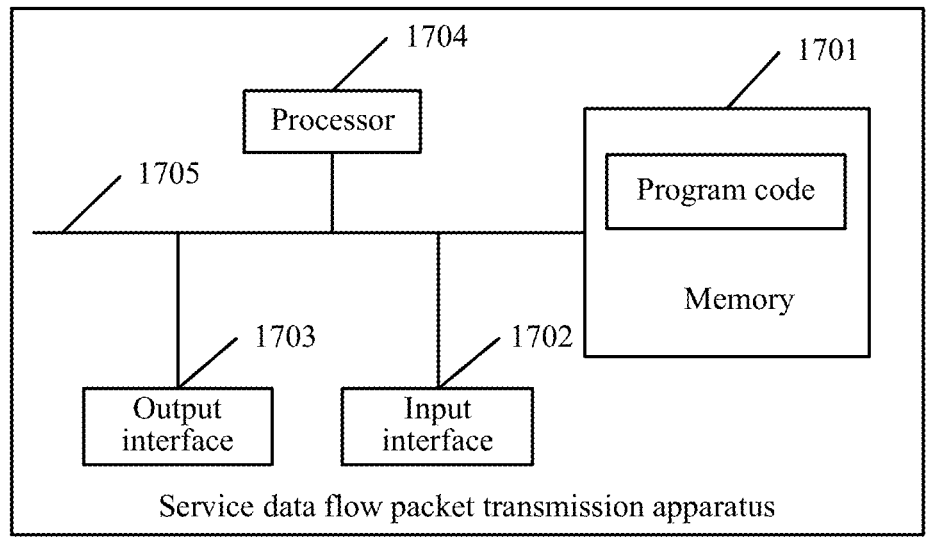
FIG. 17 is a schematic structural diagram of still another service data flow packet transmission apparatus according to an embodiment of the present disclosure.

Referring to FIG. 17, FIG. 17 is a schematic structural diagram of still another service data flow packet transmission apparatus according to an embodiment of the present disclosure. As shown in FIG. 17, the apparatus may include a memory 1701, an input interface 1702, an output interface 1703, at least one processor 1704 (for example, a CPU), and at least one communications bus 1705. The memory 1701 may be a high-speed RAM, or may be a non-volatile memory, for example, at least one magnetic disk memory. Optionally, the memory 1701 may alternatively be at least one storage apparatus located away from the processor 1704.

The communications bus 1705 is configured to implement a connection and communication between the components.

The input interface 1702 is configured to receive a service data flow packet sent by a second gateway device.

The memory 1701 stores a set of program code, and the processor 1704 invokes the program code stored in the memory 1701, to perform the following operation:

parsing the service data flow packet, to obtain a packet processing policy for the service data flow packet.

The output interface 1703 may be configured to send an indication message to the second gateway device when the packet processing policy is a local data flow offload policy. The indication message includes the local data flow offload policy, and the indication message is used to instruct the second gateway device to send, according to the local data flow offload policy, the service data flow packet to a service network corresponding to the service data flow packet.

The output interface 1703 may be configured to send the service data flow packet to the corresponding service network when the packet processing policy is not the local data flow offload policy.

In an optional embodiment, a specific manner of receiving, by the input interface 1702, a service data flow packet sent by a second gateway device may be:

receiving a tunnel packet sent by the second gateway device, and performing a tunnel header decapsulation operation on the tunnel packet, to obtain the service data flow packet.

In another optional embodiment, a specific manner of parsing, by the processor 1704, the service data flow packet, to obtain a packet processing policy for the service data flow packet may be:

parsing the service data flow packet to obtain packet characteristic information of the service data flow packet, and performing service rule matching on the service data flow packet according to the packet characteristic information, to obtain the packet processing policy.

In still another optional embodiment, the indication message further includes the service data flow packet. The input interface 1702 may be further configured to receive a response message that is for the indication message and that is sent by the second gateway device. The response message is used to indicate that the indication message has been successfully received.

It can be learned that in this embodiment of the present disclosure, UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 18:
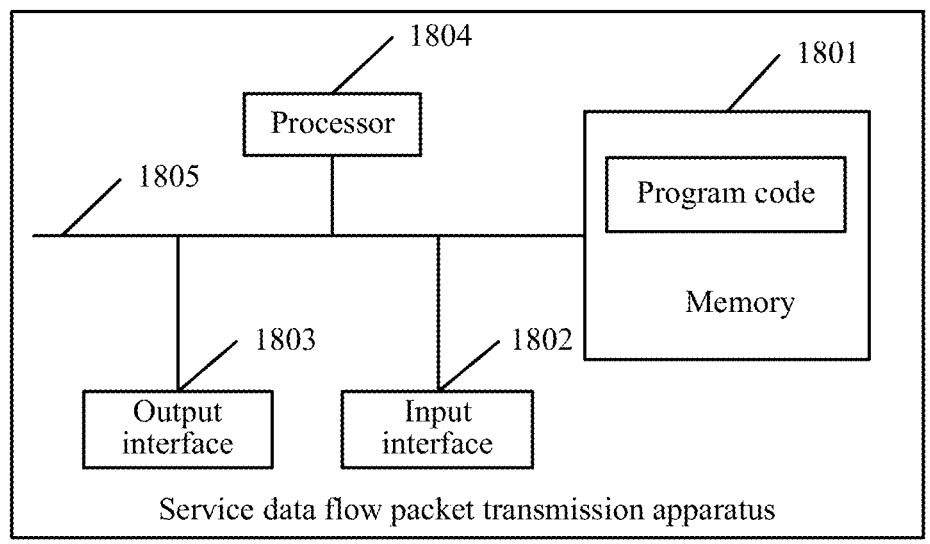
FIG. 18 is a schematic structural diagram of still another service data flow packet transmission apparatus according to an embodiment of the present disclosure.

Referring to FIG. 18, FIG. 18 is a schematic structural diagram of still another service data flow packet transmission apparatus according to an embodiment of the present disclosure. As shown in FIG. 18, the apparatus may include a memory 1801, an input interface 1802, an output interface 1803, at least one processor 1804 (for example, a CPU), and at least one communications bus 1805. The memory 1801 may be a high-speed RAM, or may be a non-volatile memory, for example, at least one magnetic disk memory. Optionally, the memory 1801 may alternatively be at least one storage apparatus located away from the processor 1804.

The communications bus 1805 is configured to implement a connection and communication between the components.

The input interface 1802 is configured to receive a service data flow packet sent by a second gateway device.

The memory 1801 stores a set of program code, and the processor 1804 invokes the program code stored in the memory 1801, to perform the following operation:

parsing the service data flow packet, to obtain packet characteristic information of the service data flow packet.

The output interface 1803 is configured to send the packet characteristic information to a third gateway device.

In an optional embodiment, a specific manner of receiving, by the input interface 1802, a service data flow packet sent by a second gateway device may be:

receiving a tunnel packet sent by the second gateway device, and performing a tunnel header decapsulation operation on the tunnel packet, to obtain the service data flow packet.

In another optional embodiment, the input interface 1802 may be further configured to receive an indication message sent by the third gateway device. The indication message includes a local data flow offload policy for the service data flow packet, and the indication message is used to instruct the second gateway device to send, according to the local data flow offload policy, the service data flow packet to a service network corresponding to the service data flow packet.

The output interface 1803 may be further configured to send the indication message to the second gateway device.

Further, optionally, the indication message may further include the service data flow packet. The input interface 1802 may be further configured to receive a response message that is for the indication message and that is sent by the second gateway device. The response message is used to indicate that the indication message has been successfully received.

It can be learned that in this embodiment of the present disclosure, UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 19:
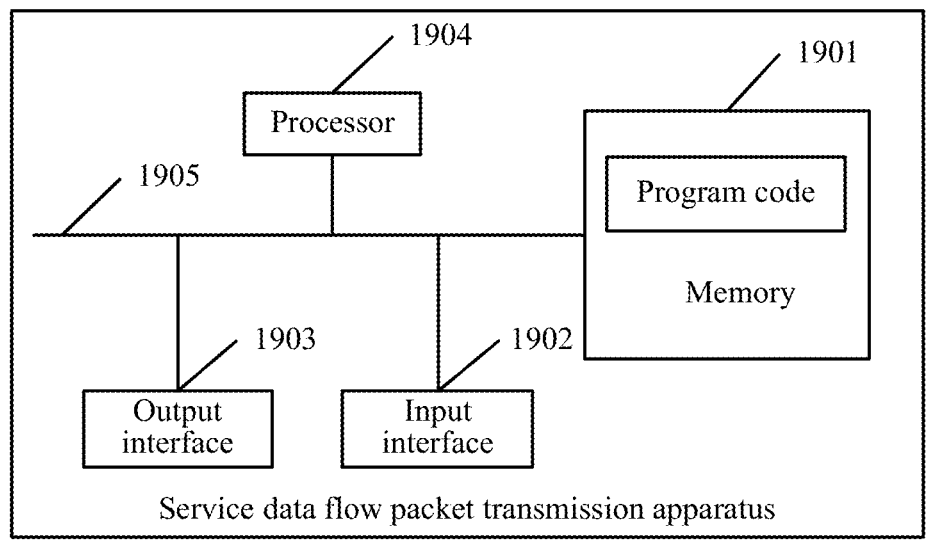
FIG. 19 is a schematic structural diagram of still another service data flow packet transmission apparatus according to an embodiment of the present disclosure.

FIG. 19 is a schematic structural diagram of still another service data flow packet transmission apparatus according to an embodiment of the present disclosure. As shown in FIG. 19, the apparatus may include a memory 1901, an input interface 1902, an output interface 1903, at least one processor 1904 (for example, a CPU), and at least one communications bus 1905. The memory 1901 may be a high-speed RAM, or may be a non-volatile memory, for example, at least one magnetic disk memory. Optionally, the memory 1901 may alternatively be at least one storage apparatus located away from the processor 1904.

The communications bus 1905 is configured to implement a connection and communication between the components.

The input interface 1902 is configured to receive packet characteristic information sent by a second gateway device. The packet characteristic information is obtained by the second gateway device by parsing a service data flow packet that is sent by a third gateway device and that is received by the second gateway device.

The memory 1901 stores a set of program code, and the processor 1904 invokes the program code stored in the memory 1901, to perform the following operation:

performing service rule matching on the service data flow packet according to the packet characteristic information.

The output interface 1903 is configured to send an indication message to the third gateway device when a matched service rule corresponding to the service data flow packet instructs to perform a local data flow offload operation on the service data flow packet. The indication message includes a local data flow offload policy for the service data flow packet, and the indication message is used to instruct the third gateway device to send, according to the local data flow offload policy, the service data flow packet to a service network corresponding to the service data flow packet.

In an optional embodiment, a specific manner of sending, by the output interface 1903, an indication message to the third gateway device may be:

sending the indication message to the third gateway device directly; or sending the indication message to the third gateway device by using the second gateway device.

Further, optionally, the indication message further includes the service data flow packet. The input interface 1902 may be further configured to: when the output interface 1903 sends the indication message to the third gateway device directly, receive a response message that is for the indication message and that is sent by the third gateway device. The response message is used to indicate that the indication message has been successfully received.

It can be learned that in this embodiment of the present disclosure, UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

Figure 20:
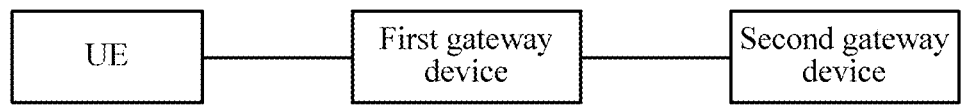
FIG. 20 is a schematic structural diagram of a service data flow packet transmission system according to an embodiment of the present disclosure.

Referring to FIG. 20, FIG. 20 is a schematic structural diagram of a service data flow packet transmission system according to an embodiment of the present disclosure. As shown in FIG. 20, the system may include UE 2001, a first gateway device 2002, and a second gateway device 2003.

The UE 2001 is configured to send a service data flow packet to the first gateway device 2002.

The first gateway device 2002 is configured to: receive the service data flow packet sent by the UE 2001, and determine whether the service data flow packet enables a first local data flow offload policy; and if a determining result is yes, send, according to the first local data flow offload policy, the service data flow packet to a service network corresponding to the service data flow packet; or if the determining result is no, send the service data flow packet to the second gateway device 2003.

The second gateway device 2003 is configured to: receive the service data flow packet sent by the first gateway device 2002, and perform an operation corresponding to the service data flow packet.

In an optional embodiment, a specific manner of receiving, by the first gateway device 2002, the service data flow packet sent by the UE 2001 may be:

receiving a first tunnel packet sent by the UE 2001, and performing a tunnel header decapsulation operation on the first tunnel packet, to obtain the service data flow packet.

A specific manner of sending, by the first gateway device 2002, the service data flow packet to the second gateway device 2003 may be:

performing a tunnel header encapsulation operation on the service data flow packet to obtain a second tunnel packet, and sending the second tunnel packet to the second gateway device 2003.

In another optional embodiment, a specific manner of performing, by the second gateway device 2003, an operation corresponding to the service data flow packet may be:

parsing the service data flow packet, to obtain a packet processing policy for the service data flow packet; and sending a first indication message to the first gateway device 2002 when the packet processing policy is a second local data flow offload policy, where the first indication message includes the second local data flow offload policy, and the first indication message is used to instruct the first gateway device 2002 to send the service data flow packet to the service network according to the local data flow offload policy; or sending the service data flow packet to the corresponding service network when the packet processing policy is not the second local data flow offload policy.

The first gateway device 2002 is further configured to: receive the first indication message, and send the service data flow packet to the service network according to the second local data flow offload policy.

Further, optionally, the first indication message may further include the service data flow packet. The first gateway device 2002 may be further configured to send a first response message for the first indication message to the second gateway device 2003. The first response message is used to indicate that the first indication message has been successfully received.

The second gateway device 2003 may be further configured to receive the first response message.

Figure 21:
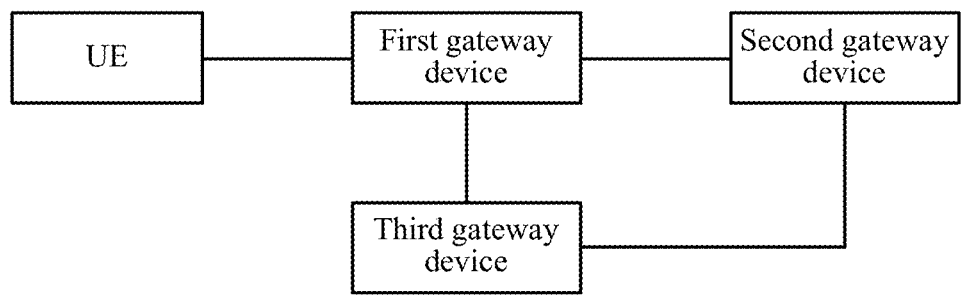
FIG. 21 is a schematic structural diagram of another service data flow packet transmission system according to an embodiment of the present disclosure.

In still another optional embodiment, the system may further include a third gateway device 2004. In this case, a structure of the system may be shown in FIG. 21. FIG. 21 is a schematic structural diagram of another service data flow packet transmission system according to an embodiment of the present disclosure.

A specific manner of performing, by the second gateway device 2003, an operation corresponding to the service data flow packet may be:

parsing the service data flow packet, to obtain packet characteristic information of the service data flow packet; and sending the packet characteristic information to the third gateway device 2004.

The third gateway device 2004 is configured to: receive the packet characteristic information sent by the second gateway device 2003; perform service rule matching on the service data flow packet according to the packet characteristic information; and send a second indication message to the first gateway device 2002 when a matched service rule corresponding to the service data flow packet instructs to perform a local data flow offload operation on the service data flow packet. The second indication message includes a third local data flow offload policy for the service data flow packet, and the second indication message is used to instruct the first gateway device 2002 to send the service data flow packet to the corresponding service network according to the third local data flow offload policy.

The first gateway device 2002 may be further configured to: receive the second indication message sent by the third gateway device 2004, and send the service data flow packet to the corresponding service network according to the third local data flow offload policy.

Further, optionally, the second indication message further includes the service data flow packet. The first gateway device 2002 may be further configured to send a second response message for the second indication message to the third gateway device 2004. The second response message is used to indicate that the second indication message has been successfully received.

The third gateway device 2004 may be further configured to receive the second response message.

In still another optional embodiment, the first local data flow offload policy may be sent by the second gateway device 2003 or the third gateway device 2004 to the first gateway device 2002 in a signaling flow process.

It can be learned that in this embodiment of the present disclosure, the UE does not need to configure a correspondence between an application APP and an APN. Therefore, applicability is desirable. In addition, a service data flow packet in a PDN can be deployed as required by determining whether a local data flow enforcement policy for the service data flow packet is stored, reducing network resource overheads and improving flexibility in service data flow packet deployment.

It should be noted that in all of the foregoing method embodiments, a 3GPP access scenario is used as an example. However, the present disclosure is not limited to the 3GPP access scenario, and may also be applied to a non-3GPP scenario. Specific descriptions are provided as follows:

1. For a trusted non-3GPP access scenario, a specific network element form of an L_DGW may be a TGW, and a specific network element form of an R_DGW may still be a PGW. The L_DGW and the R_DGW are connected to each other by using an S2a interface defined in a standard. Referring to the descriptions in the foregoing embodiments, the S2a interface is enhanced in the same way as an S5/S8 interface, so as to achieve an effect expected by the present disclosure.

2. For an untrusted non-3GPP access scenario, a specific network element form of an L_DGW may be an ePDG, and a specific network element form of an R_DGW may still be a PGW. The L_DGW and the R_DGW are connected to each other by using an S2b interface defined in a standard. Referring to the descriptions in the foregoing embodiments, the S2b interface is enhanced in the same way as an S5/S8 interface, so as to achieve an effect expected by the present disclosure.

It should be noted that, in the foregoing embodiments, the descriptions of the embodiments have respective focuses. For a part that is not detailed in an embodiment, refer to related descriptions in other embodiments. In addition, a person skilled in the art should also appreciate that all the embodiments described in the specification are examples of embodiments, and the related actions and modules are not necessarily mandatory to the present disclosure.

A sequence of the steps of the method in the embodiments of the present disclosure may be adjusted, or certain steps may also be merged or removed according to an actual need.

Merging, division, and removal may be performed on the modules in the apparatus in the embodiments of the present disclosure according to an actual need.

The modules in the embodiments of the present disclosure may be implemented by a universal integrated circuit, such as a CPU (central processing unit) or an ASIC (application-specific integrated circuit).

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed. The foregoing storage medium may include: a magnetic disk, an optical disc, a read-only memory (ROM), a random access memory (RAM), or the like.

In conclusion, the foregoing descriptions are merely examples of embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A service data flow packet transmission method, the method comprising:
   receiving, by a first gateway device, a service data flow packet from a user equipment (UE);
   in response to determining, by the first gateway device, that the service data flow packet enables a first local data flow offload policy, sending, by the first gateway device according to the first local data flow offload policy, the service data flow packet to a service network corresponding to the service data flow packet; and
   in response to determining, by the first gateway device, that the service data flow packet does not enable the first local data flow offload policy, sending, by the first gateway device, the service data flow packet to a second gateway device, receiving, by the first gateway device, a second local data flow offload policy for the service data flow packet from the second gateway device, and sending, by the first gateway device, the service data flow packet to the service network according to the second local data flow offload policy.

2. The method according to claim 1,
   wherein receiving the service data flow packet comprises:
   receiving, by the first gateway device, a first tunnel packet from the UE, and performing a tunnel header decapsulation operation on the first tunnel packet, to obtain the service data flow packet; and
   wherein sending the service data flow packet to the second gateway device comprises:
   performing, by the first gateway device, a tunnel header encapsulation operation on the service data flow packet to obtain a second tunnel packet, and sending the second tunnel packet to the second gateway device.

3. The method according to claim 1, wherein the method further comprises:
   sending, by the first gateway device, a first response message for the first indication message to the second gateway device, wherein the first response message is used to indicate that the first indication message has been successfully received.

4. The method according to claim 1, wherein the first local data flow offload policy is received by the first gateway device from the second gateway device or from a third gateway device.

5. An apparatus for service data flow packet transmission, comprising:
   an input interface configured to receive a service data flow packet from a user equipment (UE);
   a memory storing a set of program code;
   an output interface; and
   a processor configured to invoke the program code stored in the memory,
   wherein in response to the processor determining that the service data flow packet enables a first local data flow offload policy, the processor causes the output interface to send, according to the first local data flow offload policy, the service data flow packet to a service network corresponding to the service data flow packet, and
   wherein in response to the processor determining that the first service data flow packet does not enable the first local data flow offload policy, the processor causes the output interface to send the service data flow packet to a second gateway device, receive a second local data flow offload policy for the service data flow packet from the second gateway device, and send the service data flow packet to the service network according to the second local data flow offload policy.

6. The apparatus according to claim 5, wherein:
the input interface is configured to receive a first tunnel packet from the UE;
the processor is configured to perform a tunnel header decapsulation operation on the first tunnel packet, to obtain the service data flow packet, and perform a tunnel header encapsulation operation on the service data flow packet to obtain a second tunnel packet; and
the output interface is configured to send the second tunnel packet to the second gateway device.

7. The apparatus according to claim 5, wherein:
the output interface is further configured to send a first response message for the first indication message to the second gateway device, wherein the first response message is used to indicate that the first indication message has been successfully received.

8. The apparatus according to claim 5, wherein the first local data flow offload policy is received by the first gateway device from the second gateway device or from a third gateway device.

9. A system for service data flow packet transmission, the system comprising:
a first gateway device; and
a second gateway device,
wherein:
the first gateway device is configured to:
receive the service data flow packet from a user equipment,
in response to determining that the service data flow packet enables a first local data flow offload policy, send, according to the first local data flow offload policy, the service data flow packet to a service network corresponding to the service data flow packet, and
in response to determining that the service data flow packet does not enable the first local data flow offload policy, send the service data flow packet to the second gateway device, receive a second local data flow offload policy for the service data flow packet from the second gateway device, and send the service data flow packet to the service network according to the second local data flow offload policy;
the second gateway device is configured to:
receive the service data flow packet from the first gateway device,
parse the service data flow packet, to obtain the second local data flow offload policy for the service data flow packet, and
send the second local data flow offload policy to the first gateway device.

10. The system according to claim 9, wherein the first local data flow offload policy is received by the first gateway device from the second gateway device or from a third gateway device.

* * * * *